(12) United States Patent
Kerkman et al.

(10) Patent No.: US 6,469,916 B1
(45) Date of Patent: Oct. 22, 2002

(54) METHOD AND APPARATUS FOR COMPENSATING FOR DEVICE DYNAMICS AND VOLTAGE DROP IN INVERTER BASED CONTROL SYSTEMS

(75) Inventors: Russel J. Kerkman, Milwaukee; David Leggate, New Berlin, both of WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/968,072

(22) Filed: Oct. 1, 2001

(51) Int. Cl.[7] .............................. H02M 1/12; H02M 7/44
(52) U.S. Cl. ......................... 363/41; 363/98; 363/132; 318/811
(58) Field of Search .............................. 363/98, 41, 95, 363/134, 132; 318/811, 619

(56) References Cited

U.S. PATENT DOCUMENTS

| | | | | |
|---|---|---|---|---|
| 5,625,550 A | * | 4/1997 | Leggate et al. ............. 318/811 |
| 5,627,447 A | * | 5/1997 | Unsworth et al. ........... 318/138 |
| 5,671,130 A | * | 9/1997 | Kerkman et al. ............ 318/811 |
| 5,684,688 A | * | 11/1997 | Rouaud et al. ................ 363/98 |
| 5,811,949 A | * | 9/1998 | Garces ........................ 318/811 |
| 5,917,721 A | * | 6/1999 | Kerkman et al. ............. 363/41 |

* cited by examiner

*Primary Examiner*—Bao Q. Vu
(74) *Attorney, Agent, or Firm*—Michael A. Jaskolski; William R. Walbrun; Alexander M. Gerasimow

(57) ABSTRACT

A method for mitigating current distortion on inverter supply lines that supply a load with power from a PWM inverter, the inverter including a switch and diode bridge constructed using devices that are characterized by losses that cause current distortion, the invert, lines and load together characterized by inductive and capacitive dynamics that also cause line current distortions, the method including identifying both a device drop error due to device operating characteristics and a system related dynamics error due to interaction of system components and using those errors along with a more conventional dead time compensation scheme to modify modulating waveforms used in PWM comparison by a controller.

28 Claims, 12 Drawing Sheets

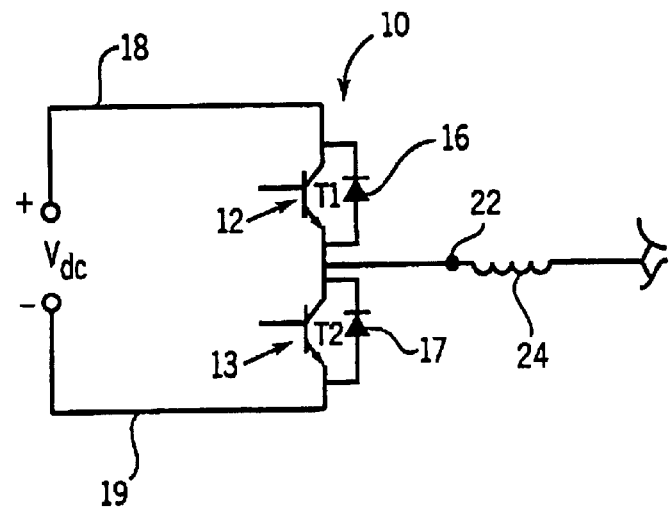
FIG. 1
Prior Art
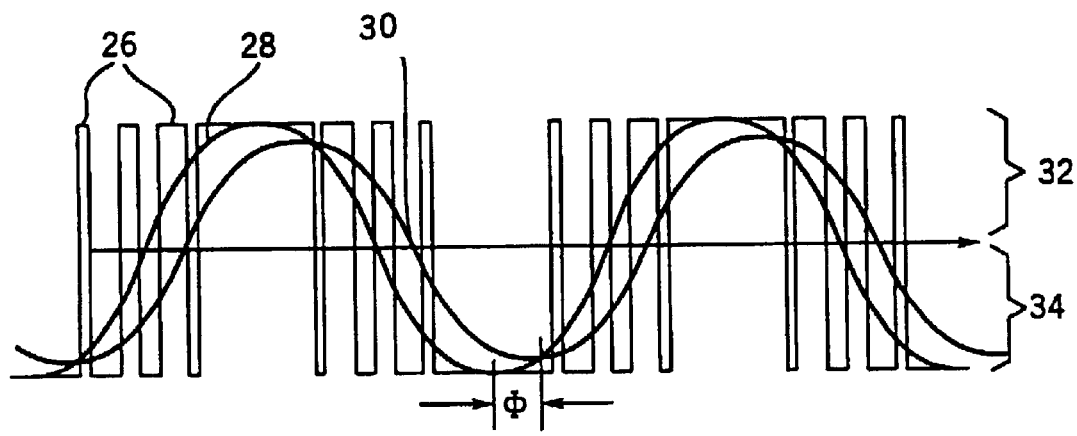
FIG. 2            Prior Art

METHOD AND APPARATUS FOR COMPENSATING FOR DEVICE DYNAMICS AND VOLTAGE DROP IN INVERTER BASED CONTROL SYSTEMS

BACKGROUND OF THE INVENTION

The present invention relates to motor controllers and more particularly to a method and an apparatus for compensating for switching device voltage losses and switching device dynamics losses in inverter systems.

One type of commonly designed motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Many ASD configurations include a pulse width modulated (PWM) inverter consisting of a plurality of switching devices. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control both the amplitude and frequency of voltage that is provided across winding 24.

Referring to FIG. 2, an exemplary sequence of high frequency voltage pulses 26 that an inverter might provide to a motor terminal can be observed along with an exemplary low frequency alternating fundamental or terminal voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the terminal voltage 28 that drives the motor. The terminal voltage 28 in turn produces a low frequency alternating current 30 that lags the voltage by a phase angle Φ.

The hardware that provides the firing pulses to the PWM inverter is typically referred to as a PWM signal generator. Among other things, a PWM generator typically includes a comparator that receives at least one modulating signal or waveform and a carrier signal/waveform for comparison. Referring to FIG. 3a, exemplary modulating and carrier waveforms used by a signal generator to generate the firing pulses for leg 10 are illustrated. As well known in the art, a carrier waveform 36 is perfectly periodic and operates at what is known as a carrier frequency. A modulating voltage waveform 38 generally and ideally is sinusoidal, having a much greater period than carrier waveform 36.

Referring also to FIGS. 3b and 3c, an ideal upper signal 40 and an ideal lower signal 42 generated by a PWM generator comparing the signals of FIG. 3a and that may control the upper and lower switches 12, 13, respectively, are illustrated. The turn-on times tu1 and tu2 and turn-off times to1, to2 of the upper and lower signals 40, 42, respectively, come from the intersections of the modulating waveform 38 and the carrier waveform 36. When the modulating waveform 38 intersects the carrier waveform 36 while the carrier waveform has a positive slope, the upper signal 40 goes OFF and lower signal 42 goes ON. On the other hand, when the modulating waveform 38 intersects the carrier waveform 36 while the carrier waveform has a negative slope, the upper signal 40 goes ON and the lower signal 42 goes OFF. Thus, by comparing the carrier waveform 36 to the modulating waveform 38, the states of the upper and lower signals 40, 42, respectively, can be determined.

While the modulating and carrier signals are referred to as waveforms in order to simplify understanding of this explanation, in reality, each of the waveforms is a digital count that represents a corresponding waveform. For instance, the modulating waveform may be converted into a count that oscillates within a range between a first or minimum modulating count equal to or greater than zero and a second or maximum modulating count. Where the modulating waveform is sinusoidal, the modulating count changes in a sinusoidal time-varying fashion indicative of the waveform. For instance, where the minimum count is zero, a carrier count oscillates in a linear time varying fashion from zero to a maximum carrier count $T_{cmax}$ (see FIG. 3a) that is equal to or greater than the maximum modulating count and back to zero during each carrier cycle. The comparator compares the modulating count with the carrier count and when the modulating count is greater than the carrier count, causes the corresponding upper and lower switches to be turned ON and OFF, respectively, and when the modulating count is less than the carrier count, causes corresponding upper and lower switches to be turned OFF and ON, respectively. Because the modulating count value determines the ratio of switch ON times to PWM period duration (i.e., carrier cycle period), the modulating often is converted to percent of the carrier period $T_s$ and referred to as a duty cycle.

When the duty cycle count is less than one-half, the resulting terminal voltage is negative because the corresponding lower switch is ON for more than half the PWM period. Similarly, when the duty cycle count is greater than one-half, the resulting terminal voltage is positive because the corresponding upper switch is ON for more than half the PWM period.

Referring also to FIGS. 2 and 3d, an ideal high frequency voltage pulse 26 resulting from the ideal upper and lower signals 40, 42 in FIGS. 3b and 3c that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON. Also, ideally, the low frequency terminal voltage and corresponding current (see FIG. 2) should completely mirror the modulating waveforms.

Unfortunately, these ideal switch operating conditions do not occur as there are several switch and inverter operating phenomenon that cause terminal voltage distortions. For example, one problem with PWM inverters has been that the high frequency terminal voltage pulses (see 26 in FIG. 2) cause ripple in the resulting low frequency phase voltages and currents. This ripple distortion has generally been addressed by either providing line filters that tend to smooth the ripple or by adopting faster switching technology. Elaborate filters are bulky and expensive and therefore are not preferred. Current inverter switching technology has advanced rapidly and modern switches are now capable of changing state in as little as several tens of nano-seconds (e.g., 50 nsec.). For this reason, recent inverter designs have typically adopted high speed switching configurations to reduce ripple distortion.

One other relatively well understood and therefore, not surprisingly, generally well compensated distortion phenomenon, is referred to as inverter switch delay. Control schemes for compensating for switch delays are generally referred to as deadtime compensation (DTC) schemes. Exemplary DTC schemes are described in U.S. Pat. No. 5,811,949 and U.S. Pat. No. 5,917,721.

While switch delays and ripple distortion are well understood and DTC and other schemes have been developed that generally minimize terminal current and voltage distortion due to turn on delays and ripple, unfortunately, experience has shown that even after DTC has been implemented and fast switching technology has been adopted, terminal voltages and currents still include appreciable distortion.

To this end, referring to FIG. 4, a terminal current is illustrated that was generated with a 10 hp industrial drive with full DTC, with a load cable of approximately 3 meters, with a 2 Hz modulating frequency and a 2 kHz carrier frequency. Clearly, under these conditions, terminal current distortion is minimal. However, referring also to FIG. 5, the terminal current in FIG. 5 was generated using the same configuration used to generate the waveform of FIG. 4, albeit with the carrier frequency increased to 8 kHz. Clearly the increased carrier frequency results in excessive and unacceptable distortion. Referring also to FIG. 6, a terminal current is illustrated where, except for the load cable length being extended from 3 meters to 60 meters, the configuration and operating conditions (i.e., carrier and modulating frequencies) used to generate the waveform is the same as that used to generate the waveform of FIG. 5. In FIG. 6 the current distortion is even greater with the longer cable and the waveform includes an appreciable DC offset.

While various general theories have been advanced to explain the distortions illustrated in FIGS. 5 and 6, a relatively incomplete understanding of the sources of these distortions has lead to inaccurate compensation. For instance, some industry members have incorrectly characterized these other distortions as the result of imperfect DTC. In these cases, where attempts have been made to mitigate these other distortions, only relatively crude methods have been adopted. For instance, one solution has been to simply adjust the DTC of a system to tune a system for operation under specific operating conditions. While commissioning of this type can accommodate specific operating characteristics (e.g. current levels, temperature, duty cycles, etc.), if the operating characteristics are altered, this solution again results in terminal voltage distortions and may, in some cases, increase the distorting affects.

One other solution to compensate for distortion not eliminated via DTC has been to provide relatively expensive fast sampling sensors and complex software architecture in one or more feedback loops. While possible in high end drive systems, unfortunately, in standard drives, such hardware and software is typically cost prohibitive.

In other cases where the sources have been recognized as generally related to interaction between inverter components and other system components (e.g., capacitive/inductive cables, loads, etc.), some industry members have recognized a correlation between the degree of distortion and switch turn-on and turn-off times. Thus, it has generally been recognized that the distortions in FIGS. 5 and 6 increase as the inverter switch turn-on and turn-off times decrease (i.e., as faster switches are used to configure the inverter). Recognizing the adverse effects of such high switching speeds, despite some of the advantages (e.g., terminal voltage ripple reduction) associated with fast switching technology, there has been a shift back toward adopting slower switching technology to reduce distortion. To this end, several next generation inverter configurations are being designed with relatively slow switching devices (e.g., devices having switching times on the order of 200 nsec.) as opposed to faster devices (e.g., devices having 50 nsec. switching times).

Thus, it would be advantageous to have a system that decreases terminal voltage distortion relatively inexpensively and that enables use of fast switching technology without causing excessive distortion.

BRIEF SUMMARY OF THE INVENTION

It has been recognized that, the sources of distortion in FIGS. 5 and 6 can be identified and their effects quantified so that relatively accurate and automated compensation can be implemented to inexpensively minimize terminal voltage distortion. To this end, and more specifically, it has been recognized that, in addition to turn on delay related distortion, there are two other de-couplable general sources of distortion including purely device related distortion and distortion related to how devices operate and interact with other inverter components as a function of specific operating characteristics. The purely device related distortion is referred to herein as "device drop" error ($V_{dde}$) while distortion related to how devices operate/interact with other components is referred to as "device dynamics" error ($V_{dye}$).

Device drop error $V_{dde}$ generally includes distortion due to the intrinsic shortcomings of the devices used to configure a control system. For instance, every electronic device has a specific voltage drop associated therewith which, over the course of several thousands of pulses, adds up to cause an appreciable terminal voltage error. It has been determined that the device voltage drop within each leg of an inverter is not constant but rather varies is a function of current magnitude, current direction, device temperature, device structure and switch states (i.e., ON or OFF).

Device dynamics error $V_{dye}$ includes distortion that results from interaction of inverter bridge devices and other system components linked thereto such as load supply cables, loads and other capacitive coupling that occurs within an inverter configuration. Generally, $V_{dye}$ is a function of current magnitude and direction.

To compensate for each of $V_{dde}$ and $V_{dye}$ the present invention provides a $V_{dde}$ compensator and a separate $V_{dye}$ compensator. The $V_{dde}$ and $V_{dye}$ compensators are independent of a dedicated DTC compensator although they compensate in a similar fashion. For instance, each of the compensators generates a duty cycle correction count that is used to alter the carrier signal count thereby generating a desired PWM output.

The $V_{dde}$ compensator is programmed to take into account the operating characteristics that affect the voltage drop across inverter devices including device temperature, duty cycle, device structure and phase current magnitude and direction. Typically, device drop data may be obtained from device manufacturers or in some cases, may be determined during a commissioning procedure.

The $V_{dye}$ compensator is programmed to take into account the operating characteristics that affect system related distortion including phase current magnitude and direction as well as duty cycle. Various values required to program the $V_{dye}$ compensator are generated during a commissioning procedure.

Consistent with the above the invention includes an apparatus for mitigating distortion at the output terminals of a multi-phase inverter drive system linked via supply lines to a load wherein the system includes an inverter and an inverter controller, the inverter including a plurality of switches that link positive and negative DC buses to the lines at output terminals, the controller receiving modulating signals and carrier signals and comparing the modulating signals and the carrier signals to generate firing pulses to control the switches, the inverter characterized by device drop losses and the system, load and lines characterized by device dynamics losses that cause terminal current distortion, device errors including both device drop and device dynamics losses, the apparatus comprising, for each phase: a device compensator receiving system phase current signals and, based on the received current signals, generating a device error compensation signal and a summer receiving the phase modulating signal and the device error compensation signal and mathematically combining the modulating signal and error signal to generate a compensated modulating signal, the summer providing the compensated modulating signal to the controller for comparison to the carrier signal.

In one aspect the invention further includes, for each phase, a dead time compensator that generates a dead time compensation error signal se that is provided to the summer, the summer, mathematically combining the dead time compensation signal, the modulating signal and the device error signal for the phase to generate the compensated modulating signals.

In one embodiment the device compensator includes both a device drop compensator and a device dynamics compensator and the device error signal includes both a device drop error and a device dynamics error signal, the summer, for each phase, mathematically combining each of the modulating signal, the device drop error signal, the device dynamics error signal and the dead time compensation error signal to generate the compensated modulating signals.

In some embodiments the controller generates a duty cycle count for each phase and the device drop compensator receives the cycle count and generates a device drop error signal as a function of both the current signals and the cycle count. Here, the device dynamics compensator may receive the cycle count and generate the device dynamics error signal as a function of both the current signals and the cycle count.

The invention may also include a temperature module that determines the temperature of the inverter devices and provides a temperature signal to the device drop compensator, the device drop compensator generating the device drop error signal as a function of the temperature signal, the current signal and the cycle count. The phase current signals may be either feedback load current signals or command signals.

In one embodiment the device compensator includes a device drop compensator, for each phase, the controller generates a duty cycle count indicating the percent $T_a/T_s$ of a carrier cycle $T_s$ during which the phase is linked to the positive DC rail, the inverter includes a switch and inverse parallel diode bridge and the device drop error signal $V_{dde}$ determined by solving the following equations, where $i>0$: $V_{dde}=(T_a/T_s)(-V_{igbt})+(1-T_a/T_s)(-V_{diode})$, and, where $i<0$: $V_{dde}=(T_a/T_s)(V_{diode})+(1-T_a/T_s)(V_{igbt})$, where $V_{diode}$ is the voltage drop across a conducting diode and $V_{igbt}$ is the voltage drop across a conducting switch. Here, when $i_u>0$ the summer adds the device drop error $V_{dde}=(T_a/T_s)(-V_{igbt})+(1-T_a/T_s)(-V_{diode})$ to the modulating signal and where $i_u<0$ the summer adds the device drop error $V_{dde}=(T_a/T_s)(V_{diode})+(1-T_a/T_s)(V_{igbt})$ to the modulating signal.

In some embodiments the device compensator includes a device dynamics compensator and the dynamics compensator determines the dynamics error signal by solving the following equations: where $I_{thresh}>i_u>0$: $V_{dye}=f(|i_u|)$ else, where $-I_{thresh}<i_u<0$: $V_{dye}=-f(|i_u|)$, where $f(|i_u|)$ is a device dynamics correction function of the inverter/load. $I_{thresh}$ is the threshold current below which the correction function is activated. It has been determined that above a certain current level $I_{thresh}$ the device dynamic compensation is not necessary to provide good results. For instance, in one exemplary system $I_{thresh}$ may be 10–40% (likely 20–30%) of the rated current for a specific system and may be set either at a factory or during a commissioning procedure. In other embodiments the $I_{thresh}$ value may be the rated current level for a given system so that the device dynamics compensation, while only minimally effective at high currents, would essentially be active at all times. The correction function may be a polynomial, multiple line segments, or linear. For a linear approximation $f(|i_u|)$ becomes: $f(|i_u|)=K(I_{thresh}-|i_u|)$. Here, when $i_u>0$ the summer subtracts the device dynamic error from the modulating signal and where $i_u<0$ the summer adds the device dynamic error to the modulating signal.

In some embodiments the controller generates a carrier count that counts back and forth between a minimum number and a maximum number and the dynamics compensator determines the dynamics error signal by solving the following equations, where the carrier count is counting up: where $I_{thresh}>i_u>0$: $V_{dye}=K(I_{thresh}-|i_u|)$ else, where $i_u<0$: $V_{dye}=T_{on}$ and where the carrier counter is counting down: where $i_u>0$: $V_{dye}=T_{on}$, else, where $I_{thresh}<i_u<0$: $V_{dye}=-K(I_{thresh}-|i_u|)$. When the counter is counting up, the device dynamics compensator subtracts the device dynamics error from the modulating signal and when the counter is counting down the device dynamics compensator adds the device dynamics error to the modulating signal.

The invention further includes methods to perform many of the processes described above in conjunction with the inventive apparatus.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a schematic diagram of a single phase of an inverter;

FIG. 2 is a graph illustrating high frequency voltage pulses generated by an inverter leg, a low frequency alternating voltage corresponding to the high frequency pulses and a low frequency current corresponding to the low frequency voltage;

DETAILED DESCRIPTION OF THE INVENTION

In the description that follows, an "*" superscript denotes a command signal, an "f" subscript denotes a feedback signal, an "e" subscript denotes an error signal, an "m" subscript denotes a modified signal, an "ll" subscript denotes a line-to-line signal, a "cm" subscript denotes a common mode signal and "u", "v" and "w" subscripts denote that corresponding signals relate to each of first, second and third system phases, respectively.

While the following description details various blocks, steps, and functions, it should be remembered that all of these elements are meant to be implemented in software as computer programs and represent algorithms for execution by a conventional-type digital microprocessor or, in the alternative, could be implemented via a dedicated hardware platform.

A. Theory

Figure 4:
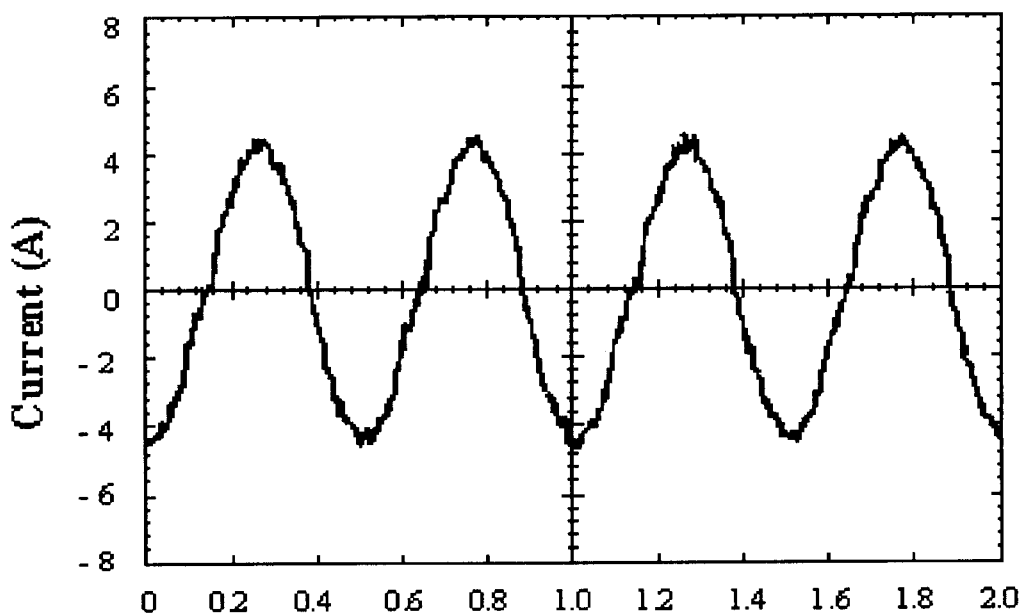
FIG. 4 is a graph illustrating a line current generated using a 2 kHz carrier frequency.

Referring again to FIG. 4, with a PWM carrier period $T_s$ and assuming an ideal duty cycle $T_{idc}$, an ideal pole or terminal voltage $V^*$ and an error volt age $V_e$ corresponding to a particular one of the errors (e.g., $V_{pbe}$, etc.) described below, a resulting duty cycle can be represented by the following equation:

$$\frac{T_{idc} - T_e}{T_s} = \frac{1}{2} + \frac{V^*}{V_{dc}} - \frac{V_e}{V_{dc}} \qquad \text{Eq. 1}$$

Equation 1 can be simplified to yield:

$$\frac{T_e}{T_s} = \frac{V_e}{V_{dc}} \qquad \text{Eq. 2}$$

Thus, if an error can be identified as either a voltage magnitude $V_e$ or a duty cycle count $T_e$, the identified value or its counterpart can be employed to generate a compensating signal.

Figure 7:
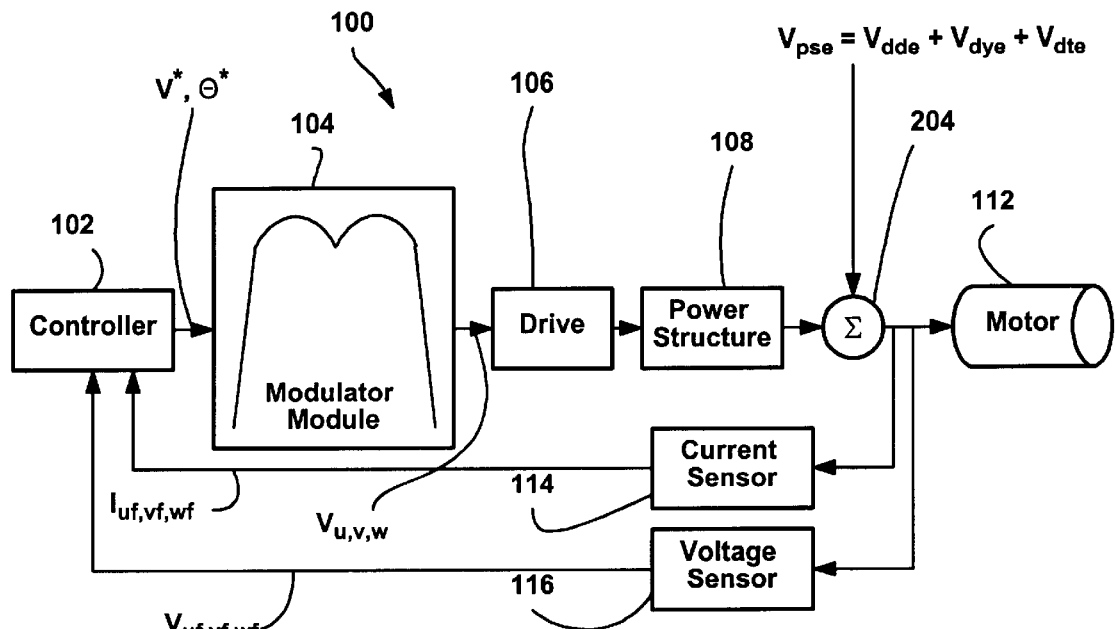
FIG. 7 is a schematic diagram of an exemplary power control system.

Referring now to FIG. 7, an exemplary control system 100 includes a controller 102, a modulator module 104, a PWM drive 106, a power structure or inverter 108, a motor 112, a current sensor 114 and a voltage sensor 116. Controller 102 provides a command voltage and operating angle $V^*$, $\theta^*$, respectively, to module 104 which in turn generates modulating waveforms $V_u$, $V_v$ and $V_w$ that are provided to drive 106. Drive 106 uses the modulating waveforms $V_u$, $V_v$ and $V_w$ to generate firing pulses that are provided to inverter 108 switches to turn the switches on and off in a controlled sequence (see FIGS. 1 and 2). Inverter 108 generates voltages and corresponding currents in cables linked to motor 112. Current, and perhaps also voltage, are measured at cable terminals and provided as feedback signals $I_{uf}$, $I_{vf}$, $I_{wf}$ and $V_{uf}$, $V_{vf}$ and $V_{wf}$ to controller 102 via sensors 114 and 116, respectively.

As explained in more detail below, inverter 108 and the cables that, link inverter 108 to motor 112 together cause a lumped power structure error $V_{pse}$ within system 100. In order to simplify visualization of the power structure error $V_{pse}$, a summer 204 is provided which shows error $V_{pse}$ being added to the output of an ideal power structure 108.

It should be understood that, in addition to power structure error $V_{pse}$, system 100 includes many other error sources such as a control board error associated with sampling delays and quantization shortcomings of module 104, a power board error associated with gate delay of drive 106 and a load error associated with load operating parameters. While each of these errors occur, each of these errors is either insignificant and therefore ignored herein or has been studied and mitigated using various design and control techniques and therefore is not described or addressed here in detail.

As indicated in FIG. 7, power structure error $V_{pse}$ includes, among other components, a deadtime error $V_{dte}$, device drop error $V_{dde}$ and device dynamics error $V_{dye}$. As indicated above, the contribution deadtime $V_{dte}$ makes to voltage distortion is well documented and correction techniques have been established. The device drop and device dynamics errors $V_{dde}$ and $V_{dye}$, respectively, however, are less well understood and therefore further explanation is necessary to establish their existence, the magnitudes of each and how each can be compensated.

Each of device drop $V_{dde}$ and device dynamics $V_{dye}$ errors are discussed separately hereinafter and are collectively referred to as device errors.

1. Device Drop Error $V_{dde}$

Referring again to FIG. 1, assuming that each of switches T1 and T2 has similar operating characteristics, each of diodes 16 and 17 has similar operating characteristics and that each of the switches and diodes is characterized by a voltage drop when conducting, four separate equations can be written to describe the voltage at terminal 22 under each of four possible sets of operating conditions. A first of the four sets of operating conditions includes positive current (i.e., current flowing through terminal 22 from left to right as illustrated) with upper switch T1 closed and the lower switch T2 open. Under these conditions positive current passes from bus 18 through switch T1 to terminal 22 and therefore there is a voltage drop $V_{igbt}$ across conducting switch T1 and the phase output voltage (i.e., the voltage at terminal 22) can be described by the Equation:

$$V_{term} = V_{dc} - V_{igbt} \qquad \text{Eq. 3}$$

where $V_{dc}$ is the DC bus voltage.

A second of the four sets of operating conditions includes positive current (i.e., current flowing through terminal 22 from left to right as illustrated) with upper switch T1 open and the lower switch T2 closed. Under these conditions the positive current is drawn from negative bus 19 through diode 17 to terminal 22 so that there is a voltage drop across diode 17 and the phase output voltage can be described by the equation:

$$V_{term} = -V_{diode} \qquad \text{Eq. 4}$$

where $V_{diode}$ is the voltage drop across switch diode 17 during conduction.

A third of the four sets of operating conditions includes negative current (i.e., current flowing through terminal 22 from right to left as illustrated) with upper switch T1 closed and lower switch T2 open. Under these conditions, referring still to FIG. 1, the negative current passes through diode 16 to positive bus 18 so that there is a voltage drop across diode 16 and the phase output voltage can be described by the equation:

$$V_{term} = V_{dc} + V_{diode} \qquad \text{Eq. 5}$$

A fourth of the four sets of operating conditions includes negative current (i.e., current flowing through terminal 22 from right to left as illustrated) with upper switch T1 open and lower switch T2 closed. Under these conditions, the negative current passes through switch T2 to negative bus 19 so that there is a voltage drop across switch T2 and the phase output voltage can be described by the equation:

$$V_{term} = V_{igbt} \qquad \text{Eq. 6}$$

Because the terminal voltage at terminal 22 is supposed to be either $V_{dc}$ or zero, depending on if terminal 22 is linked to the positive or negative DC busses, actual voltage drops or device losses corresponding to Equations 3 through 6 above can be expressed as:

$$V_{dd} = -V_{igbt} \qquad \text{Eq. 7}$$

$$V_{dd} = -V_{diode} \qquad \text{Eq. 8}$$

$$V_{dd} = V_{diode} \qquad \text{Eq. 9}$$

$$V_{dd} = V_{igbt} \qquad \text{Eq. 10}$$

respectively.

Figure 3A:
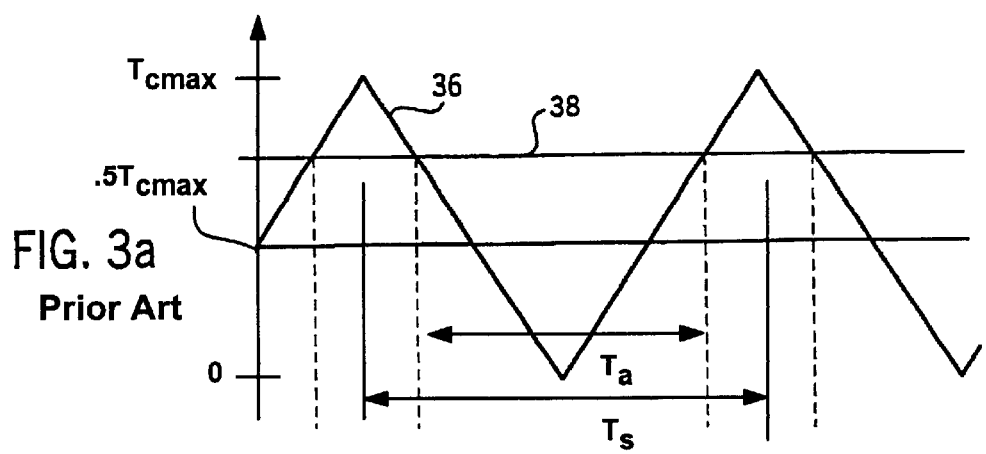
FIG. 3a is a graph illustrating a carrier signal and a corresponding modulating signal.
Figure 3B:
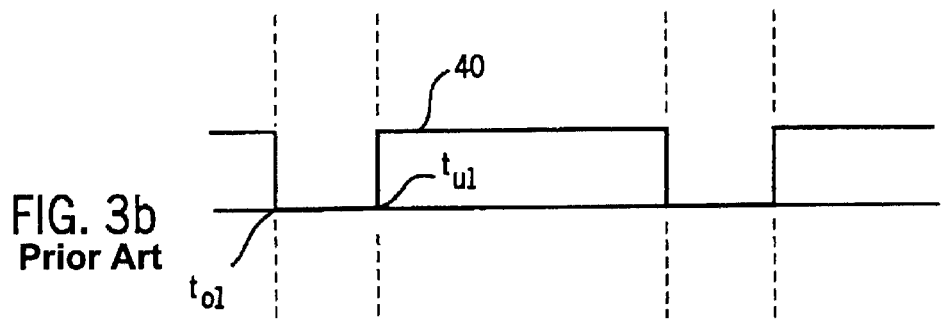
FIGS. 3b and 3c are firing pulses corresponding to the signals in FIG. 3a and FIG. 3d is a graph illustrating a high frequency voltage pulse sequence like the high frequency pulses in FIG. 2 that corresponds to the signals in FIGS. 3a through 3c.
Figure 3C:
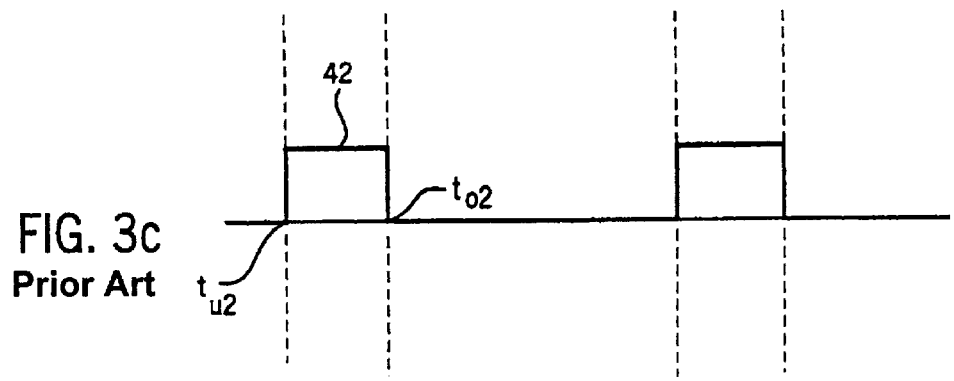
Figure 3D:
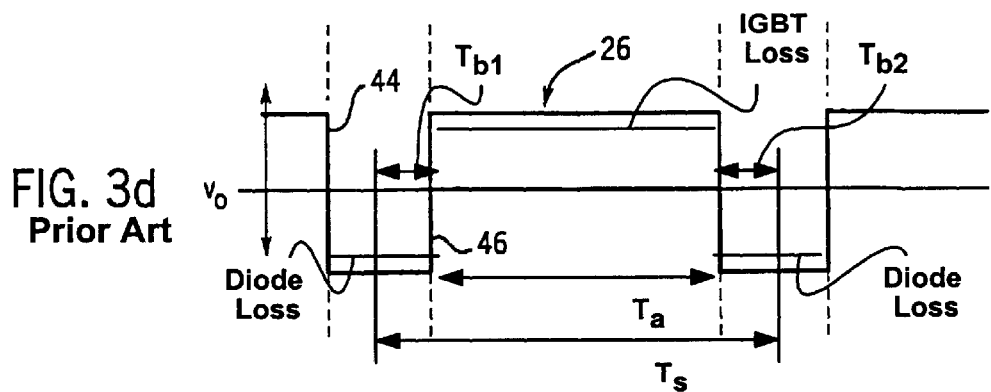

Referring again to FIGS. 1 and 3*d*, where the phase output current is positive, each carrier period $T_s$ can be divided into three sub-periods including first period Tb1, a middle period $T_a$ and an end period Tb2 where lower diode 17 conducts during the first and end periods Tb1 and Tb2, respectively, and upper switch T1 conducts during the middle period $T_a$ where Tb1+Tb2=$(1-T_a/T_s)$. Thus, Equation 7 above can be modified to express the switch T1 loss during a specific carrier period to render the equation:

$$V_{dd} = (T_a/T_s)(-V_{igbt}) \qquad \text{Eq. 11}$$

and Equation 8 can be modified to express diode 17 loss during a specific carrier period to render the equation:

$$V_{dd} = (1-T_a/T_s)(-V_{diode}) \qquad \text{Eq. 12}$$

Similarly, Equations 9 and 10 can be modified to express switch and diode drops during negative current flow and during a specific carrier period to render the following two equations, respectively:

$$V_{dd} = (T_a/T_s)(V_{diode}) \qquad \text{Eq. 13}$$

$$V_{dd} = (1-T_a/T_s)(V_{igbt}) \qquad \text{Eq. 14}$$

Equations 11 and 12 can be combined and Equations 13 and 14 can be combined to render device loss equations for positive and negative current polarity, respectively, as follows:

$$i>0: V_{dde} = (T_a/T_s)(-V_{igbt}) + (1-T_a/T_s)(-V_{diode}) \qquad \text{Eq. 15}$$

$$i<0: V_{dde} = (T_a/T_s)(V_{diode}) + (1-T_a/T_s)(V_{igbt}) \qquad \text{Eq. 16}$$

Thus, where diode and switch voltage drops are known, Equations 15 and 16 can be used to determine each phase legs contribution to terminal voltage error.

As indicated above, inverter device (e.g., diode, IGBT, etc.), operating characteristics and, more specifically, device drop, varies as a function of both temperature and current (magnitude and direction). The varying device drops affect the overall volt-seconds that occur during the course of each PWM carrier cycle. Thus, for Equations 15 and 16 to be accurate, drops $V_{igbt}$ and $V_{diode}$ have to be expressed in a manner that takes into account current and temperature. Switch and diode drops $V_{igbt}$ and $V_{diode}$ that take into account current and temperature conditions, can be expressed as:

$$V_{igbt} = (|i_u|)(S_{slope}) + V_{Sbias} \qquad \text{Eq. 17}$$

$$V_{diode} = (|I_u|)(D_{slope}) + V_{dbias} \qquad \text{Eq. 18}$$

where $|i_u|$ is the magnitude of a phase current, $S_{slope}$ is a predetermined value corresponding to IGBT conduction voltage drop as a function of temperature, $V_{Sbias}$ is a bias voltage drop corresponding to the switch, $D_{slope}$ is a predetermined value corresponding to diode conduction voltage drop as a function of temperature and $V_{dbias}$ is a bias voltage drop corresponding to the diode. Each of values $S_{slope}$, $V_{Sbias}$, $D_{slope}$ and $V_{dbias}$ can obtain from power device data sheets provided by manufacturers of the switches and diodes used to configure the inverter.

Figure 8:
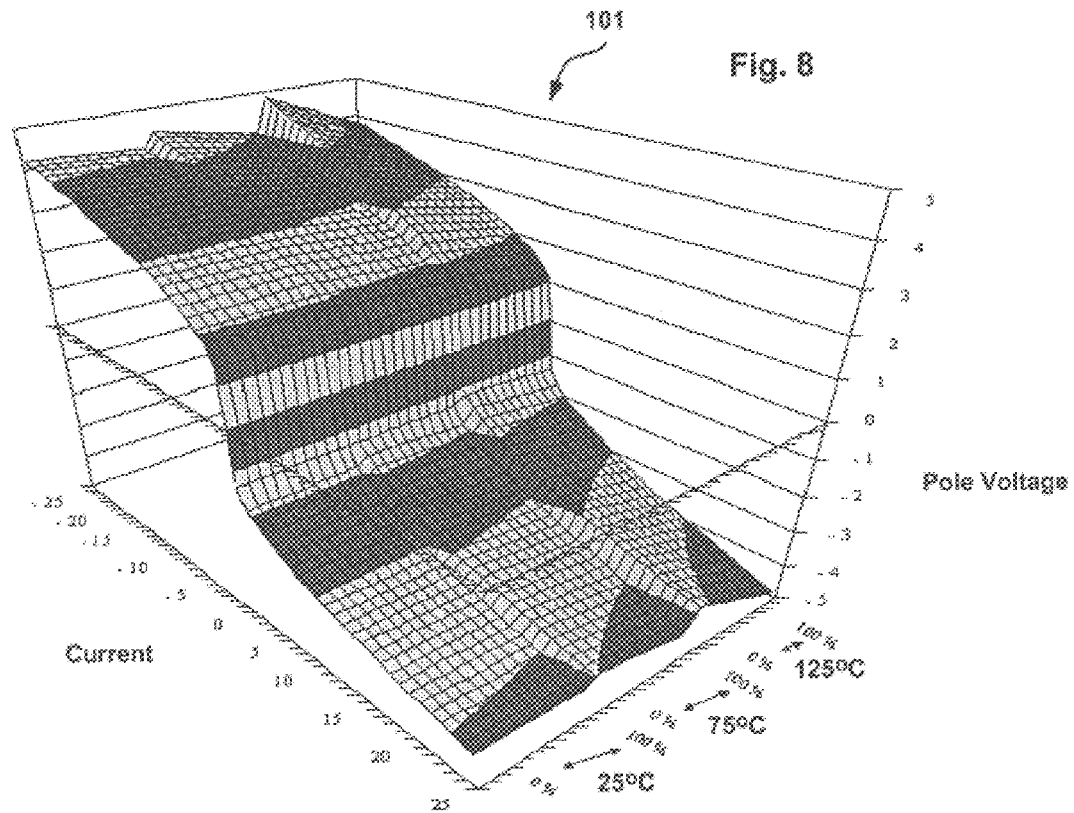
FIG. 8 is a plot illustrating device voltage drop as a function of current, temperature and duty cycle.

Referring now to FIG. 8, a voltage drop plot 101 for a single inverter phase leg (e.g., see illustrated phase in FIG. 1) generated using data corresponding to an inverter configured with Eupec BSM25GP120B1 non-punch through (NPT) IGBTs and employing Equations 15 through 18 is illustrated for various currents, duty cycles and temperatures. The surface of plot 101 corresponds to three thermal planes including 25° C., 75° C. and 125° C. with the duty cycle varying from 0 to 100%. Several characteristics of the plots in FIG. 8 are of interest. Clearly the total device drop is a function of current level, temperature and duty cycle. In addition, low speed or low output voltage (i.e., low duty cycle) causes significant relative device drop. Moreover, at a given temperature and current level, device drop varies essentially linearly as a function of duty cycle.

Referring still to FIG. 8 and again to Equation 2, it should be appreciated that the device drop voltage error for an inverter configured as described above falls within a range between 0.9V and 4.885V at a carrier frequency of 2 kHz (e.g., a duty cycle error value $T_e$ of between 0.692 and 3.757 $\mu$s), a value that is comparable to a typical deadtime value.

2. Device Dynamics Error $V_{dye}$

Referring again to FIG. 7, inverter 108, in conjunction with the supply cables linking inverter 108 to load 112, also causes device dynamic errors $V_{dye}$ (constituting a portion of power structure error $V_{pse}$) which can be recognized via differing ON and OFF switching times of inverter switches under different operating conditions and where supply cable lengths are varied. To this end, referring also to FIGS. 10*a* and 10*b*, each of FIGS. 10*a* and 10*b* displays the phase-to-bus voltages $V_u$, $V_v$ for two poles of a 75 (10) hp voltage source inverter and a resulting line-to-line voltage $V_{u-v}$. The nominal conditions for both FIGS. 10*a* and 10*b* were zero electrical frequency and 2 kHz carrier frequency, voltage commands were 5 $V_{dc}$ and 15 $V_{dc}$, respectively, and expected current levels were 2.33 DC amps and 6.44 DC amps, respectively.

Figure 10A:
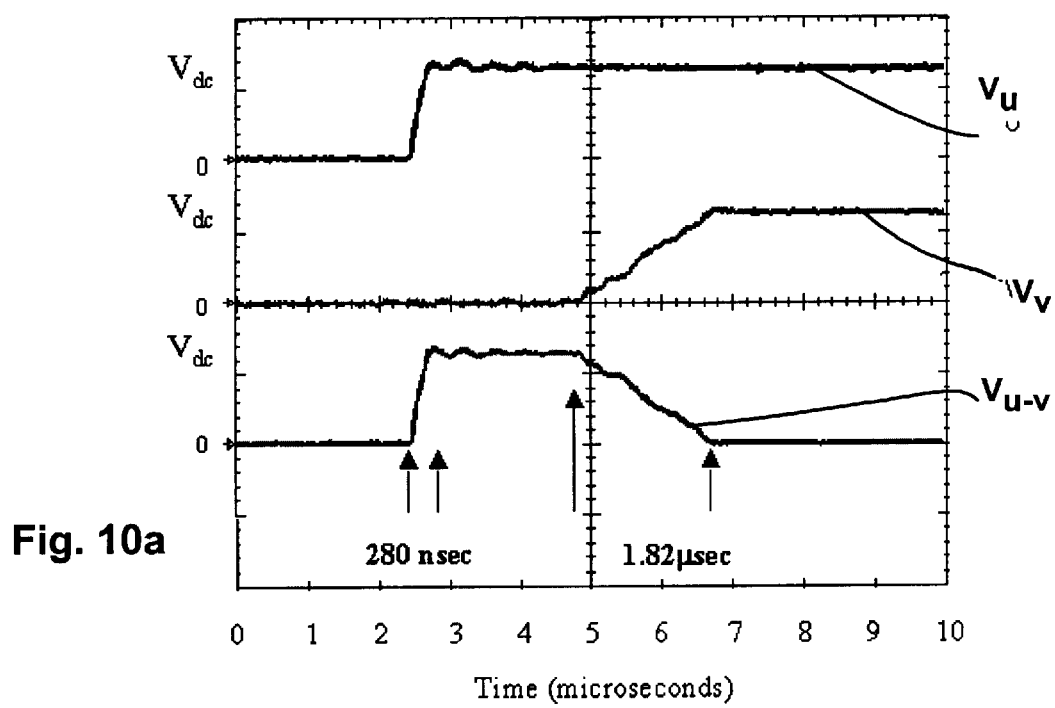
FIG. 10a is graph illustrating two-phase voltages and an associated line-to-line voltage.
Figure 10B:
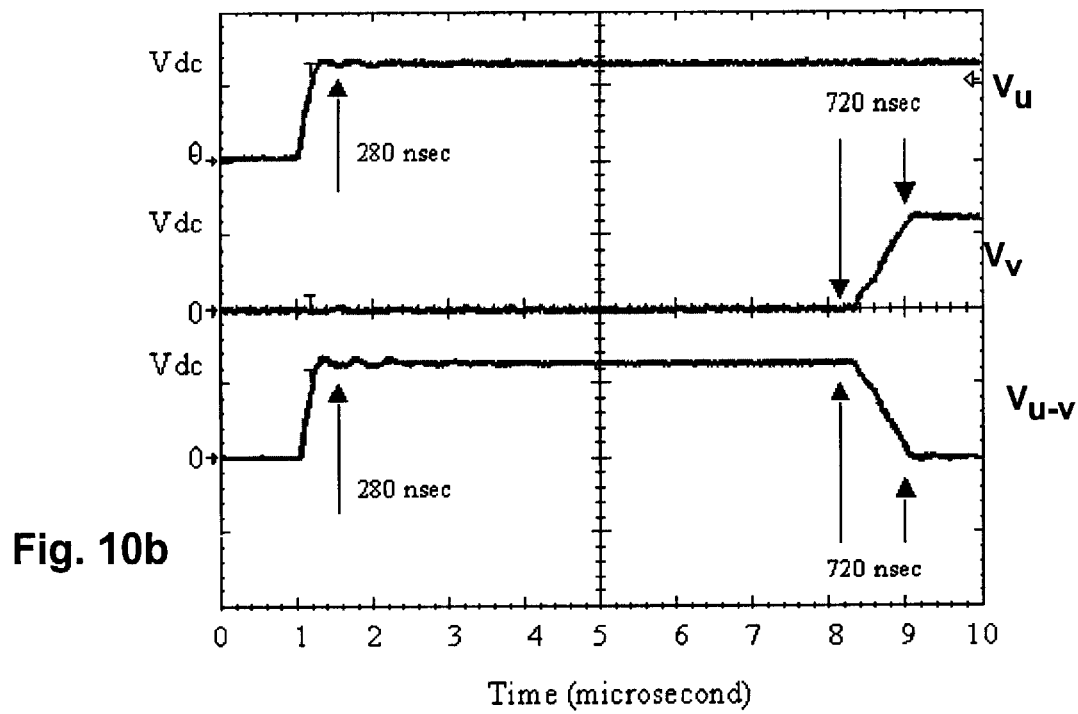
FIG. 10b is similar to FIG. 10a, albeit having been generated with a relatively larger magnitude line current.

As illustrated, regardless of current level, the leading edge transition time of the upper trace $V_u$ in each of FIGS. 10*a* and 10*b* is approximately 280 nsec. However, the transition time for second trace $V_v$ is 1.82 $\mu$sec in FIG. 10*a*, and 720 nsec in FIG. 10*b*. These non-symmetrical and non-rectangular voltage pulses create an error in the line-to-line voltage $V_{u-v}$ applied to the load. Considering that deadtime compensation in modern inverter system is typically within a range from 2–4 $\mu$secs, rise and fall time voltage errors of the aforementioned magnitudes are significant.

Figure 12:
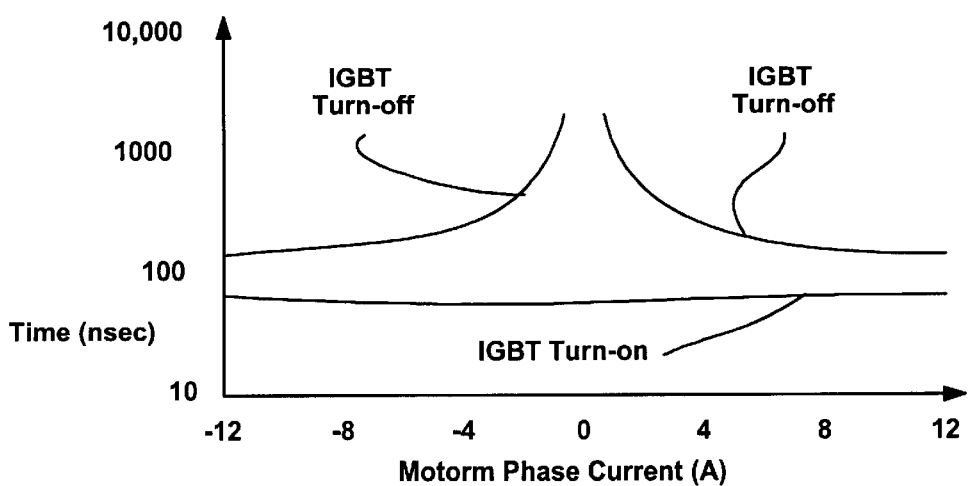
FIG. 12 is a graph illustrating IGBT turn on and turn off times as a function of motor phase current.

Referring to FIG. 12, plotting transition time as a function of current, it can be seen that the turn-on times of IGBTs essentially remain independent of current but that the turn-off times vary non-linearly as a function of current. The results in FIG. 12 clearly show that the transition times depend on the condition under which the inverter operates.

Figure 11A:
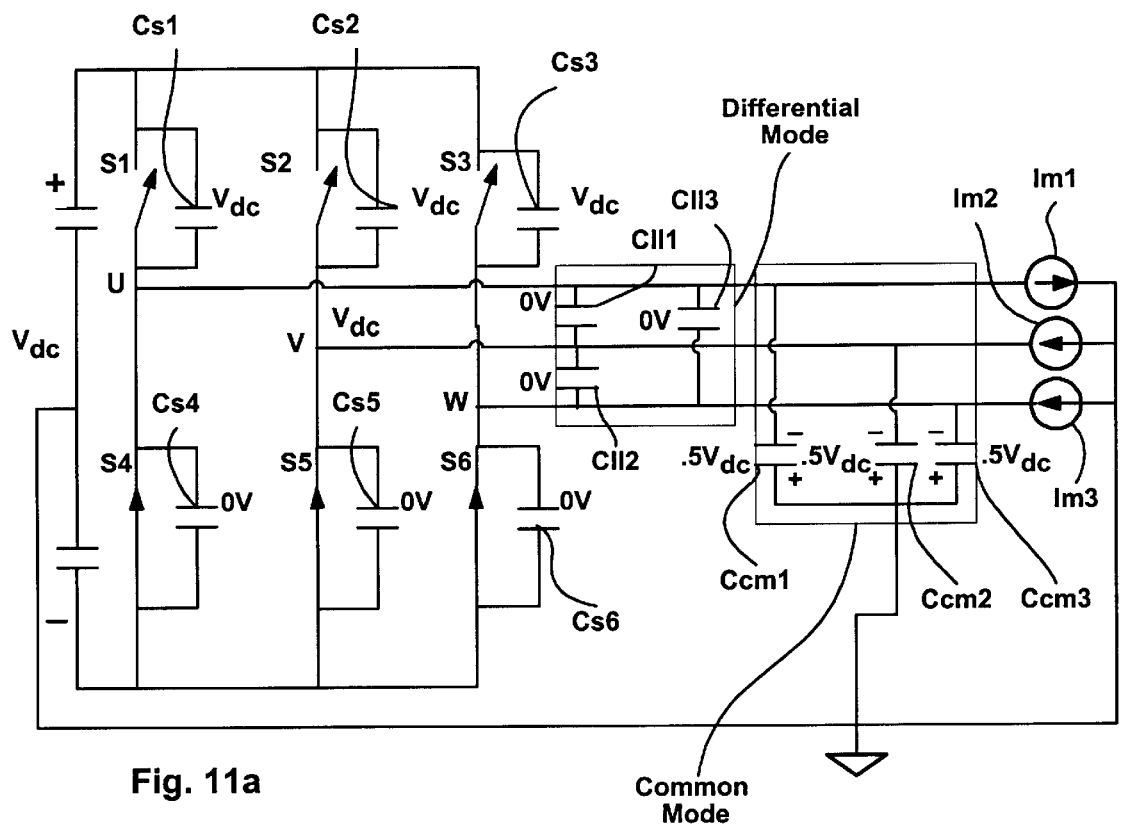
FIG. 11a is a schematic diagram of a model used for simulation purposes including an inverter and a short supply cable system linked to an exemplary load.
Figure 11B:
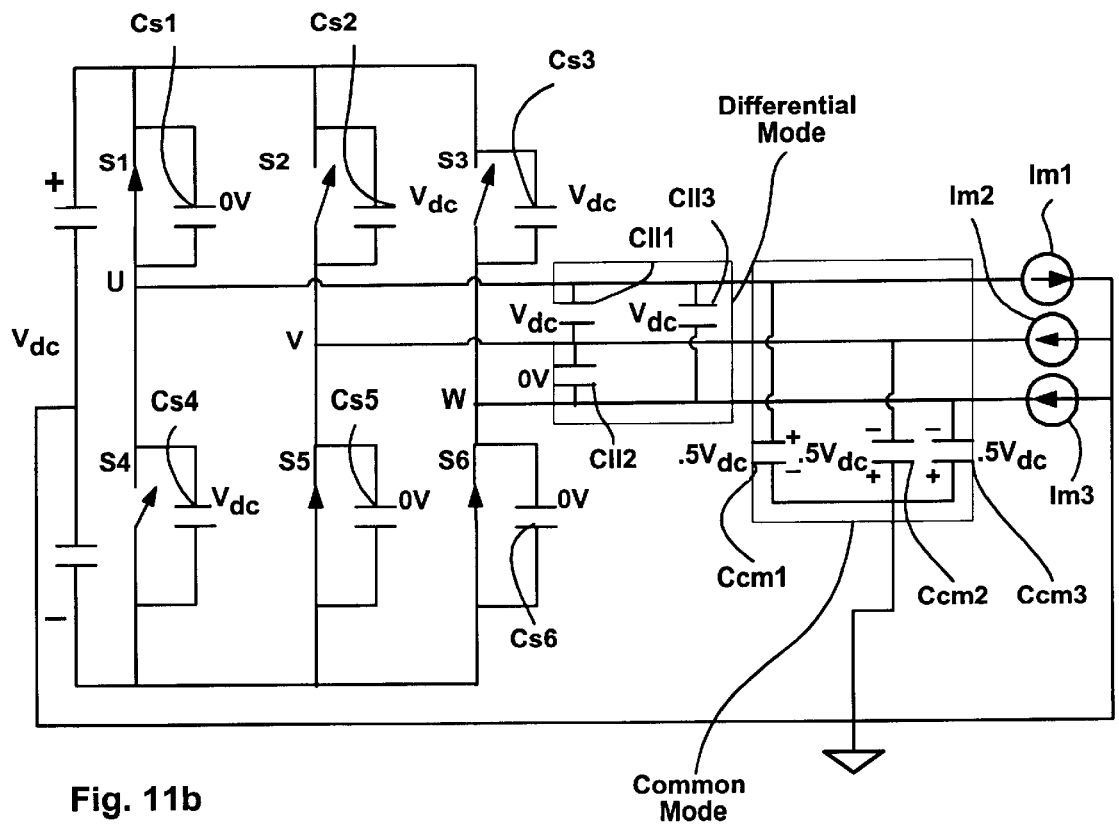
FIG. 11b is similar to FIG. 11a, albeit illustrating a second inverter state.
Figure 11C:
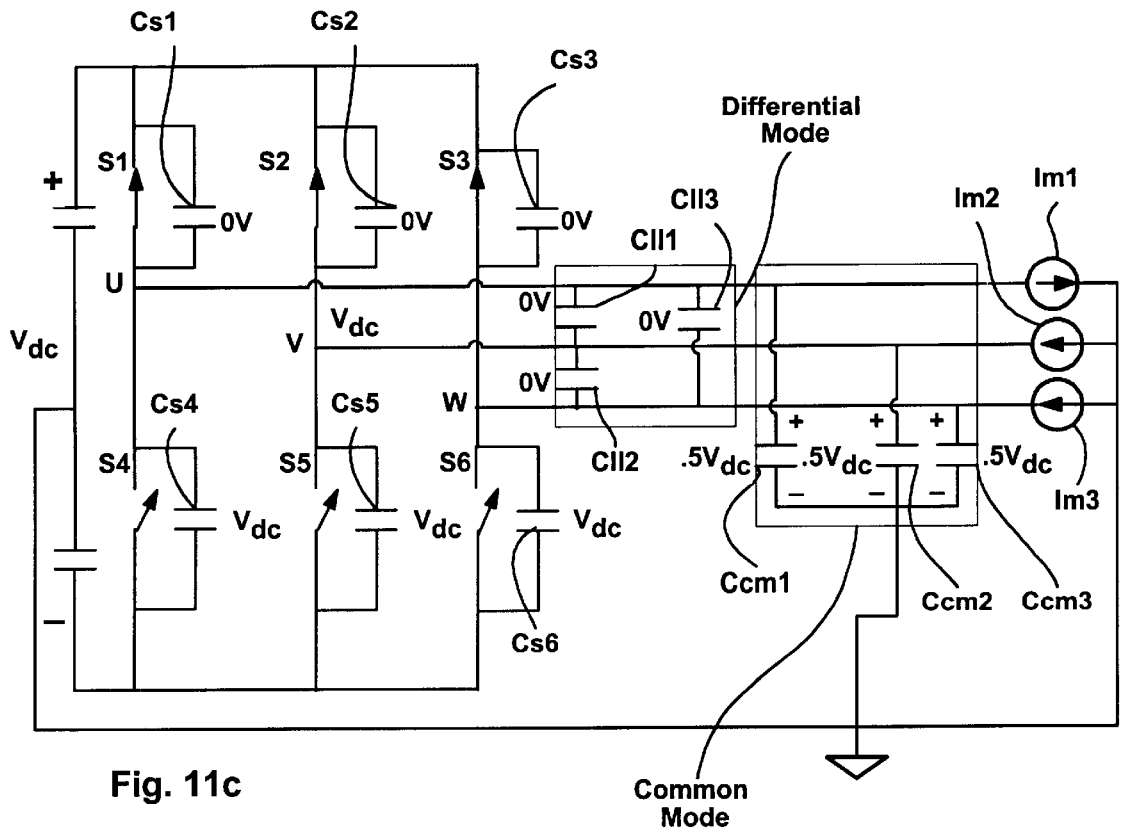
FIG. 11c is similar to FIG. 11a, albeit illustrating a third inverter state.

Referring now to FIGS. 11*a* through 11*c*, a simplified inverter/motor/short cable model (i.e., the cable can be lumped with motor 112 in FIG. 7 for analysis) is illustrated that has been used to study why the varying switching cycle durations discussed above occur. To this end the model includes switches S1, S2, S3, S4, S5 and S6 that link supply lines of cables to positive and negative DC rails. While S1, S2, etc. are referred to herein as switches, it should be appreciated that each switch S1 actually includes an IGBT and corresponding inverse parallel diode (e.g., see FIG. 1). With respect to device capacitance, the FIG. 11*a* model only includes IGBT collector to emitter device capacitances Cs1 through Cs6. This simplification is justifiable as capacitances Csn dominates other device capacitances.

The FIG. 11*a* model also includes differential line capacitances CII1 through CII3, a separate capacitance CII1 through CII3 between each two motor supply lines (i.e., between each two phases u–v, v–w and u–w), common mode capacitances Ccm1 through Ccm3, a separate capacitance Ccm1 through Ccm3 between each supply line and ground, and motor current sources Im1 through Im3 in phases U, V and W, respectively. The direction of each current source may be either from the inverter or toward the inverter and reflects mode of excitation. As illustrated, DC current is injected into U-phase and splits evenly between V and W phases. The corresponding states over one-half PWM cycles are illustrated in FIGS. 11*a*–11*c* and include states (000), (100) and (111), respectively, where zeros and 1's in each state correspond to the U, V and W phases, respectively, a zero indicating that a phase is linked to the negative DC rail and a 1 indicating that a phase is linked to the positive DC rail. For instance, state 100 indicates that switches S1, S5 and S6 are closed and that the other switches are open such that phases U, V and W are liked to the positive rail, the negative rail and the negative rail, respectively.

Initially, in state (000), each of switches S4, S5 and S6 are closed so that each of phases U, V and W are linked to the negative rail. In this state, zero voltage is built up across capacitors Cs4, Cs5 and Cs6 while $V_{dc}$ is applied across each of capacitors Cs1, Cs2 and Cs3. In addition, each of the differential mode capacitors are discharged while voltages $V_{dc}/2$ occur across each of common mode capacitors Ccm1, Ccm2 and Ccm3.

Upon switching from state (000) in FIG. 11*a* to state (100) in FIG. 11*b*, with the polarity as illustrated (i.e., current entering phase U and splitting among phases V and W), U-phase current transfers from the lower U-pole's diode (not separately illustrated) to upper IGBT S1 when upper IGBT S1 is closed. Turning on upper IGBT S1 instantaneously discharges capacitor Cs1. Simultaneously, differential mode capacitances CII1 and CII3 between U-phase and V and W phases, respectively, and lower U-pole device capacitor Cs4 are charged by dc link voltage $V_{dc}$ through the U-phase IGBT S1. Finally, U-phase common mode capacitor Ccm1 must reverse its charge to accommodate the new inverter state. As shown in FIG. 10*a*, the time to make this transition in the system tested was approximately 280 nsec.

Referring to FIGS. 11*b* and 11*c*, upon switching from state (100) to state (111), upper V and W pole capacitors Cs2 and Cs3 and U-V and U-W differential mode capacitors CII2 and CII3 discharge, lower V and W pole capacitors Cs4 and Cs6 charge and V and W phase common mode capacitors Ccm2 and Ccm3 have to reverse polarity. Because of V and W phase current polarity, transition begins immediately when V and W phase lower IGBTs S5 and S6 are turned OFF and during a "deadtime period" as well known in the art. This transitioning causes the voltage $V_v$ distortion observed in FIG. 10*a* (i.e., 1.82 $\mu$sec for the system tested). The remaining portion of the PWM cycle (i.e., 111, 100, 000), reverses the sequence described above such that V and W phases transition in 280 nsec and the U-phase requires 1.82 $\mu$sec.

Figure 9:
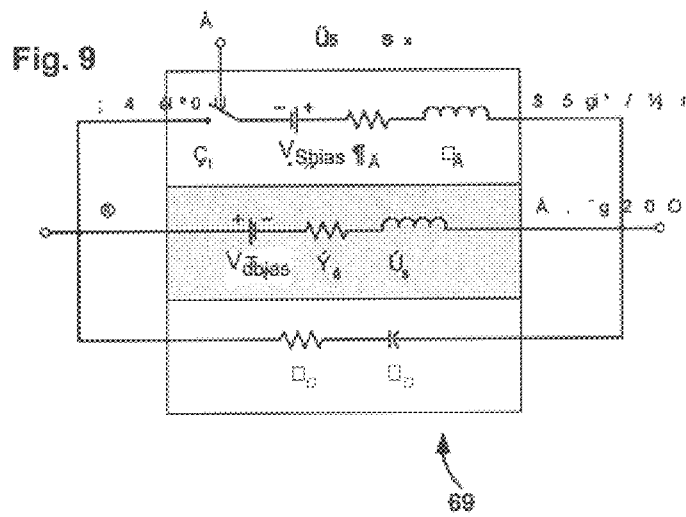
FIG. 9 is a schematic diagram illustrating a model of power devices used to construct an inverter.

A simulation was developed to validate the theory regarding interaction between system capacitances presented above. System components (i.e., switches and diodes) were modeled to include the elements illustrated in FIGS. 9. To this end, instead of assuming ideal power devices, a more accurate device model has to be developed and employed. Referring now to FIG. 9, one useful IGBT-diode model 69 includes three parallel branches, a first branch consisting of series resistance $R_s$ and capacitance $C_s$, a second branch consisting of a series diode blocking voltage $V_{dbias}$, a diode resistance $R_d$ and a stray inductance $L_{stray}$ and the third branch consisting of an ideal switch $S_{ideal}$ in series with a switch blocking voltage $V_{Sbias}$, a resistance $R_{on}$ and a switch on inductance $L_{on}$.

The parameter values used for modeling purposes were obtained from manufacturer's data or through commissioning tests and include the values in the following Table I:

TABLE I

| FIG. 9 Model | | FIG. 11a Model | |
| --- | --- | --- | --- |
| Component | Value | Component | Value |
| $R_{on}$ | 40 mΩ | $C_{II}$ | 0.20 nF |
| $L_{stray}$ | 100 nH | $C_{cm}$ | 0.40 nF |
| $V_{dbias}$ | 0.90 V | | |
| $R_d$ | 30 mΩ | | |
| $V_{sbias}$ | 0.90 V | | |
| $C_s$ | 2.250 nF | | |
| $R_s$ | 1.75 Ω | | |

With U-phase current positive, upper U-phase IGBT S1 turned on with a rate governed by the device turn on characteristics. In simulations with both 5 $V_{dc\ and}$ 15 $V_{dc}$ values, V-phase current exhibited a response almost identical to the response illustrated in FIGS. 10a and 10b, confirming that a lower nominal current (as in FIG. 10a) extends switching time for at least certain switches within an inverter structure.

Using simulations, studies were conducted to examine the effects of varying the capacitance of the system on the transition times of V and W-phases. Through variations in the differential and/or common mode capacitances in the FIG. 11a model, several general conclusions were drawn regarding the effect of motor frame size and cable construction. First, increasing frame size increases differential and common mode capacitance. Second, applying shielded cable increases common mode capacitance. Third, each of increasing frame size and applying a shielded cable increase device dynamic voltage distortion $V_{dye}$.

Thus, the varying device dynamics exhibited in FIGS. 10a and 10b alter the applied voltage resulting in current distortion and a corresponding increase in torque pulsations. In FIGS. 10a and 10b line voltage U-V increases over one 2 kHz PWM cycle according to Eq. 2 by:

$$V_{lle} = 2\ V_e = 2\ V_{dc} \frac{T_e}{T_s} \quad \text{Eq. 17}$$

Missing X sign

In an exemplary case where DC bus voltage $V_{dc}$ is 650V, a switching cycle $T_s$ is 500 μs and error $T_e$ is 1.82–0.28 μsec, the line to line error $V_{lle}$ is:

$$Vllerr = 2*650\ V * \frac{(1.82 - 0.28)\ \mu s}{500\ \mu s} = 4.00\ V \quad \text{Eq. 18}$$

Eq. 17 indicates that increasing carrier frequency (i.e., decreasing $T_s$) increases the error introduced by device dynamics. This partially explains the waveform illustrated in FIG. 5. Thus, increasing carrier frequency increases line voltage distortion resulting in flux and current waveform distortion, thereby limiting low speed system performance.

Figure 13:
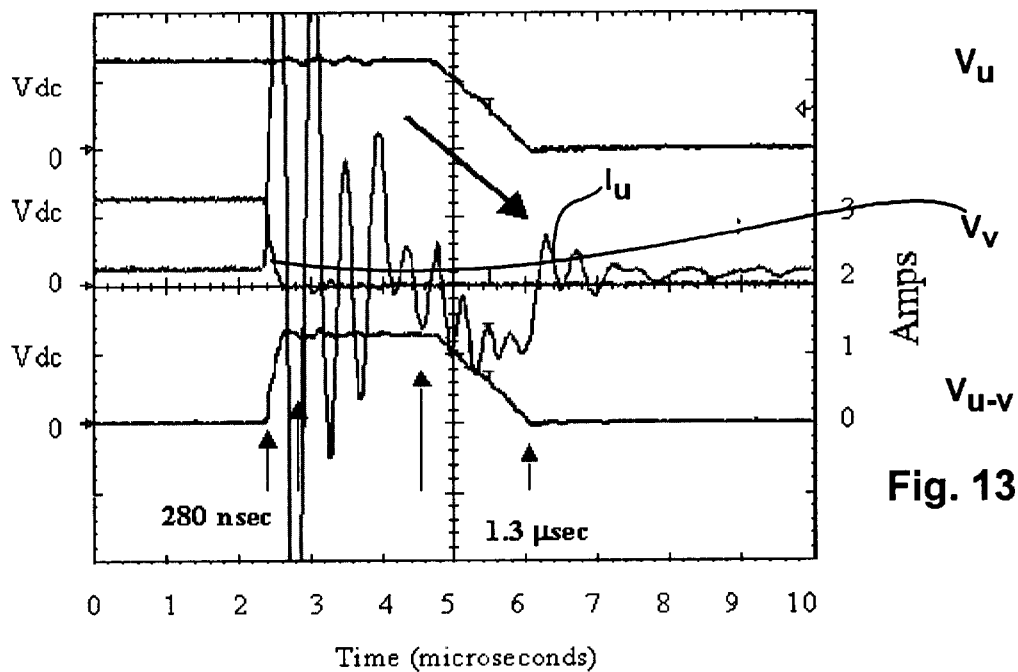
FIG. 13 is a graph similar to FIG. 10a, albeit including a U-phase current waveform and having been generated with a modified capacitance condition.

Referring again to FIGS. 10a and 10b and considering the above discussion related to FIGS. 11a through 11c, it can be deduced that the reduction in switching times between FIGS. 10a (1.82 μsec) and 10b (0.72 nsec) is the result of current available for charging system capacitances. To this end, referring also to FIG. 13, FIG. 13 is similar to FIG. 10a, albeit showing a transition from state (100) to state (000) and, in addition to including the signals illustrated in FIG. 10a, includes a U-phase current waveform $I_u$. Importantly, at the beginning of the transition of the U-phase voltage, U-phase current $I_u$ is characterized by a ramped decrease in magnitude. This ramped deceasing magnitude is necessary to satisfy the constraints set by the inverter sources in FIG. 11a and to discharge the common mode capacitances. Thus, as the nominal current level decreases and/or the common mode capacitance increases, the time necessary to reverse system capacitance voltage polarities increases.

Figure 14:
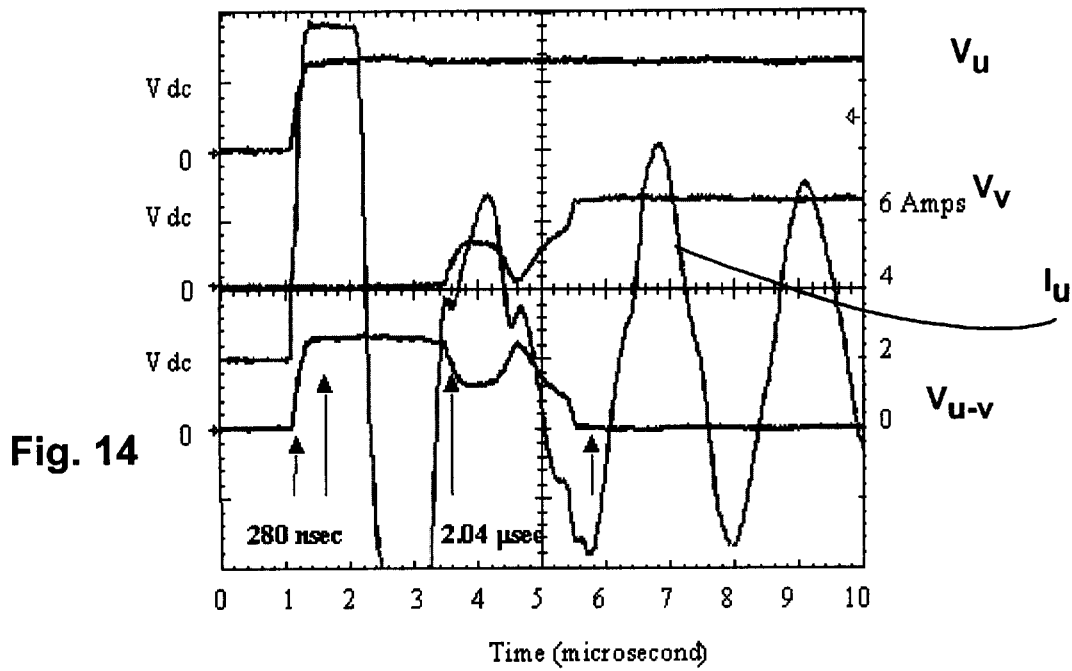
FIG. 14 is a graph similar to FIG. 10a, albeit having been generated with a system including relatively longer supply cables and including a single phase current waveform.

The previous discussion regarding device dynamics distortion $V_{dye}$ assumed short load supply cables between the inverter 108 and load 112. Referring again to FIG. 6, it can be seen that increasing cable lengths causes additional load current distortion. The adverse effects of long cables on motor drive reliability is well documented and mitigation strategies are routinely incorporated into VSI drive systems. Long cables and their interaction with an inverter, however, have not been adequately studied and compensated. FIG. 14 shows the same signals as FIG. 10a with the addition of U-phase current $I_u$ where cable length has been increased from 10 feet to 200 feet with a relative low 5 $V_{dc}$ value that caused a relatively low line current.

As illustrated, increasing the cable length had essentially no effect on U-phase transition time (e.g., 280 nsec.) but clearly extended the transition period of and distorted the V-phase voltage. The line-to-line voltage pulse $V_{u-v}$ had a transition time of 2.04 μsec, a 12% increase over the transition time in FIG. 10a which causes an increase in DC current. Tests showed that increasing the carrier frequency from 2 kHz to 8 kHz boosted the DC current 200% which accounts for the DC offset illustrated in FIG. 6. Although not illustrated, where line current was increased, the V-phase distortion was reduced appreciably.

Unlike the short cable case (FIG. 10a) where drive dynamics are controlled by motor common mode impedance, the interplay between device and distributed cable impedance dominates where the cable length is long. Thus, the traveling wave voltage and current together set the boundary conditions at the drive and preclude a linear change in terminal voltage.

Table II summarizes the above discussion and lists dominant contributors to terminal voltage distortion for low value voltage commands. By decoupling the distortion components, comparison of the relative contribution each error source makes to terminal voltage distortion is facilitated. The voltage values in Table II assume a 650 $V_{dc}$ bus. For the deadtime and dynamics entries, a carrier frequency range from 2–8 kHz was assumed yielding the value range indicated. Device drop was obtained using the results of FIG. 8. Device dynamics data was compiled knowing transition times vary inversely with current.

TABLE II

| | Terr (μs) | Verr (V) |
| --- | --- | --- |
| Deadtime | 2.0 | 2.6–10.4 |
| Device Drop | 0.069–3.757 | 0.9–4.885 |
| Dynamics | | |
| 3 m (10 ft) Cable | 0.44–3.08 | 2.288–16.016 |
| 60 m (200 ft) Cable | 1.52–3.52 | 7.904–18.304 |

B. Application of Invention

Cost constraints require general purpose drives to employ a minimum number of sensors and restrict software architecture. These constraints limit the overall performance of general purpose drives. In general purpose drives twice per carrier current sampling is an architectural standard (i.e., high sampling voltage sensors are confined to relatively expensive and high performance drives). Thus, correction for voltage distortion in a general-purpose drive devolves to mitigation as opposed to complete compensation.

Figure 15:
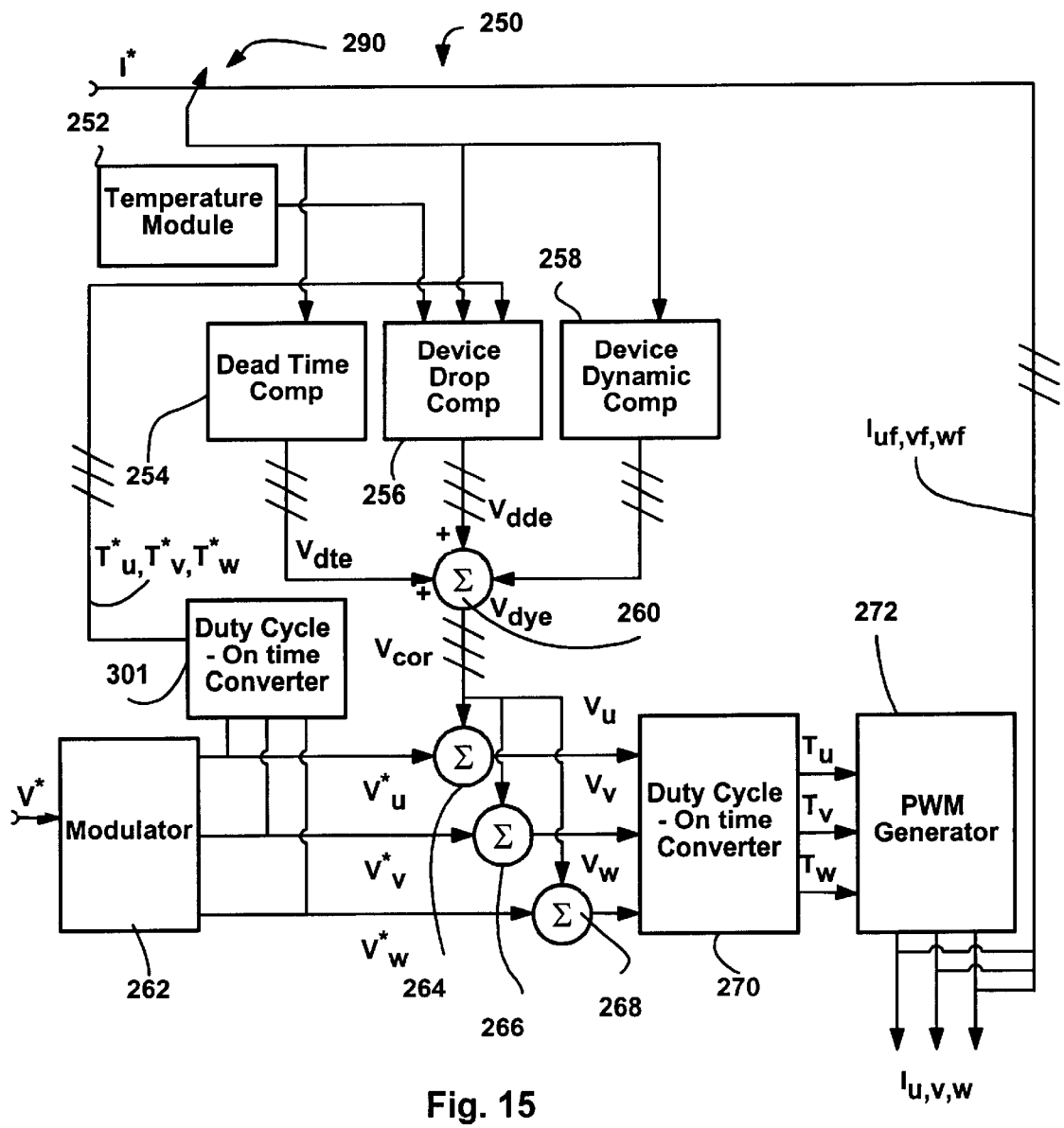
FIG. 15 is a schematic diagram illustrating a control system according to the present invention.

Referring now to FIG. 15, an inventive control configuration 250 is illustrated. Configuration 250 includes components that attenuate the adverse effects of voltage distortion caused by each of deadtime, device drop and device dynamics errors. To this end, configuration 250 includes a modulation module 262, a first duty cycle on-time converter 301, a second duty cycle on-time converter 270, a PWM generator 272, a temperature module 252, a DTC compensator 254, a device drop compensator (DDD) 256, (the DDD and DYDs collectively referred to as device compensators), a device dynamics compensator 258 (DYD), three summers 264, 266 and 268 and number 260 which collectively represents three separate summers, a separate one of the collective summers associated with each of the three phases U, V and W.

Module 262 generates three command voltage waveforms $V_u^*$, $V_v^*$ and $V_w^*$ which are provided to summers 264, 266 and 268, respectively, and which are also provided to the first duty cycle-on time converter 301. Converter 301 determines the on times or duty cycle counts for each phase and provides its outputs to device drop compensator 256. Each of summers 264, 266 and 268 also receives a combined voltage correction signal $V_{cor}$ from one of the summers collectively identified by numeral 260, adds the correction signal $V_{cor}$ from the summer 260 to the corresponding command signal $V_u^*$, $V_v^*$ or $V_w^*$ and provides a compensated modulating signal $V_u$, $V_v$ or $V_w$ to converter 270.

Upon receiving the compensated modulating signals, converter 270 converts each of the signals $V_u$, $V_v$ or $V_w$ to a duty cycle count $T_u$, $T_v$ and $T_w$, respectively, and provides the counts to generator 272. Generator 272 includes a carrier signal generator, a comparator, a DC source and an inverter including IGBT switching devices (none of which are separately illustrated). The comparator compares each of the duty cycle counts with a carrier signal generator count to generate firing pulses for controlling inverter $IGBT_s$. The IGBTs are then controlled to link the DC rails to inverter output lines corresponding to phases U, V and W. As described above the pulses on the output lines cause line currents $I_u$, $I_v$ and $I_w$, therein.

In at least one embodiment of the invention, configuration 250 includes a current feedback loop. The current feedback loop includes two or three current sensors (e.g., Hall effect), a separate sensor linked to each of the output lines to provide feedback current signals $I_{uf}$, $I_{vf}$ and $I_{wf}$ to each of compensators 254, 256 and 258. In addition to the signals from the feedback loops, DDC 252 also receives an IGBT temperature signal from temperature module 208.

As well known in the DTC art, compensator 254 estimates the feedback current polarity and adjusts the pulse width accordingly in any of the several different manners already practiced in the art. It should suffice to say that deadtime compensator 254 performs separate compensation calculations for each of the three phases U, V and W providing three separate compensation signals (collectively identified as signals $V_{dtc}$) to summers 260 (i.e., numeral 260 corresponds to three separate summers, one for each phase).

Referring still to FIG. 15, in cases where a command current I* is not available to adjust the compensation factors $V_{cor}$, feedback currents $I_{uf}$, $I_{vf}$ and $I_{wf}$ are provided to each of deadtime compensator 254, device drop compensator 256 and device dynamic compensator 258. However, in cases where a command current is available (i.e., current regulated inverters), current command I* may be employed instead of the feedback currents $I_{uf}$, $I_{vf}$ and $I_{wf}$ for compensation purposes and to break the positive feedback loop. In cases where command current I* is available, using the command signal obviates the need for feedback current sensors. In addition, because deadtime compensation adjusts a compensation signal as a function of current polarity, compensation accuracy depends on accuracy of zero current crossing detection and distortion can increase if the sampling delay or quantization produce an incorrect or phase shifted polarity. Thus, were possible, positive feedback should be broken and command signal I* employed. In the illustrated configuration numeral 290 collectively indicates three separate single pole, double throw switches that are useable to select one of the command current I* and the feedback currents $I_{uf}$, $I_{vf}$ and $I_{wf}$ to be provided to compensators 254, 256 and 258.

To correct for device drop, Equations 15 through 18 are solved for device drop errors $V_{dde}$ using values from device data sheets and/or derived during a commissioning procedure thereby generating data that resembles FIG. 8. The data may be in the form of a plot like FIG. 8 or, in the alternative, may be placed in a look-up table that correlates voltage drop $V_{dde}$ with current magnitude and polarity temperature and duty cycle. Thus, upon receiving current, temperature and duty cycle values, compensator 256 generates a device drop compensation signal $V_{dde}$ for each of the three motor phases and provides the signals $V_{dde}$ to summers 260.

During current dependent transitions, however, a more complex loss equation must be employed. To this end, referring to FIG. 11a, assuming a positive U-phase current and that switches S1 and S4 are initially closed and open, respectively, current passes through switch S1 to the U-phase load. Upon opening switch S1, capacitor Cs4, initially charged at $V_{dc}$, must dump its charge to allow capacitor Cs1 to charge with current from the U-phase. The dynamics related to the transfer of the U-phase terminal from the plus dc bus to the minus dc bus is a function of the U-phase current magnitude $f(|i_u|)$. The form of the function $f(|i_u|)$ is dependent on system configuration as, as indicated above, system configuration (e.g., cable lengths, capacitances, load, etc.) affects device dynamics.

Thus, referring again to FIGS. 3a–3d, noting that when the carrier signal 36 is counting up and intersects the modulating signal 38 the corresponding upper switch is turned off (e.g., $t_{a1}$) and the lower on and that when the carrier signal 36 intersects the modulating signal 38 on the way down the corresponding upper and lower switches turn on and off, respectively, device dynamics errors can be expressed by the following equations:
where $I_{thresh} > i_u > 0$:

$$V_{dye} = f(|i_u|) \qquad \text{Eq. 19}$$

and, where $-I_{thresh} < i_u < 0$:

$$V_{dye} = -f(|i_u|) \qquad \text{Eq. 20}$$

The results from Equation 19 are subtracted from the corresponding modulating signal and the results from Equation 20 are added to the corresponding modulating signal according to the following equations, respectively:

$$V_u = V_u^* - V_{dye} \qquad \text{Eq. 21}$$

$$V_u = V_u^* + V_{dye} \qquad \text{Eq. 22}$$

These additions and subtractions are actually carried out by summers 260 which either add or subtract the dynamic errors to the dead time and device drop errors to generate the correction voltage $V_{cor}$ which is in turn added to a corresponding modulating signal via one of summers 264, 266 or 268.

System function f can take on a linear, piecewise linear, polynomial, or dynamic form. A linear model is the least complex and has been found to significantly reduce the voltage error. Where linear, system function f may be represented as $f(|i_u|)=K(I_{thresh}-|i_u|)$. To identify system constant K, a commissioning procedure must be performed with a system configured like the system of FIG. 15 and with compensator 258 programmed to support Equations 19 through 22. Values $T_{on}$ and $V_{diode}$ can be obtained from a device manufacturers data sheet. To commission known DC voltage command voltages can be used to drive the system 250 and feedback currents can be obtained and compared to expected feedback currents. To this end, assuming a given load and an excitation voltage expected feedback currents can be calculated for comparison purposes. For instance, where first and second DC voltages $V_{dc1}$ and $V_{dc2}$ are used to excite system 250 and $V_{dc1}$ and $V_{dc2}$ are 1 and 10 volts, respectively, expected load currents may be 1 and 10 amps. During commissioning it may be determined that, with a unity K value, 1 volt $V_{dc1}$ yields 0.5 amps current while 10 volts $V_{dc2}$ yields 9.5 amps. For each DC excitation voltage the K value required to generate the expected load currents may be determined and employed in Equations 19 through 22 as described above. For instance, using the numbers above, a K value or first gain value of approximately 2 may be necessary to generate the expected 1 amp when $V_{dc1}$ (i.e., 1V) is used to excite the system while a K value or second gain value of approximately 1 may be necessary to generate the expected 10 amps when $V_{dc2}$ (i.e., 10V) is used to excite the system. In this case the average K value or gain value would be approximately 1.5 (i.e., (1+2)/2=1.5).

Figure 5:
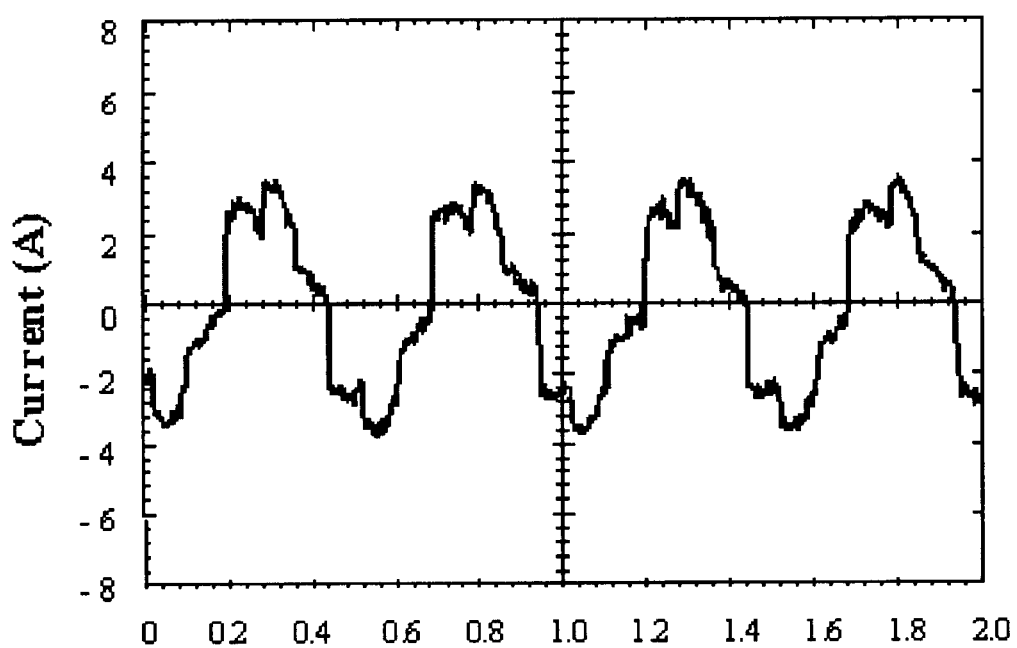
FIG. 5 is a graph similar to FIG. 4, albeit including distortion due to an 8 kHz carrier frequency.
Figure 6:
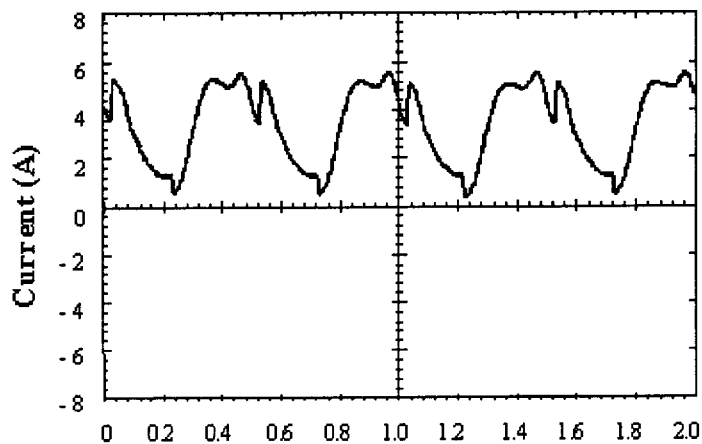
FIG. 6 is similar to FIG. 5, albeit generated via an inverter linked to a load with relatively longer cables.

Experimental results illustrated that employing the inventive compensators the current distortion in FIGS. 5 and 6 were appreciably reduced and rendered results that are acceptable for most applications. In addition, it was determined, not surprisingly, that employing either of the DDC or DYD improved system performance appreciably.

It should be understood that the methods and apparatuses described above are only exemplary and do not limit the scope of the invention, and that various modifications could be made by those skilled in the art that would fall under the scope of the invention. For example, instead of identifying a single K value to be used in device dynamics equations as described above, two values may be determined and employed to increase correction precision. To this end, for instance, one K value K1 may be determined for phase currents between 0 amps and 20% of the rated RMS current while a second K value K2 may be determined for phase currents greater than 20% of rated RMS current. Here it is assumed different bias values $V_{diode1}$ and $V_{diode2}$ would be obtained from device data sheets and stored in a memory. Then, where the phase current is positive Equation 19 would be used with K1 and $V_{diode1}$ values when the current is between 0 amps and 20% of the rated current and with values K2 and $V_{diode2}$ when the current is greater than 20% of the rated current. Similarly, where the current is negative and between 0 amps and −20% rated current Equation 19 may be used with K1 and $V_{diode1}$ values and if the current is less than −20% rated current Equation 19 may be used with K2 and $V_{diode2}$ values. Other device dynamics schemes are contemplated.

As another example, instead of providing corrective voltages $V_{cor}$ that are used to modify modulating waveforms, the invention may be implemented in a system where duty cycle correction values $T_{cor}$ are generated and used to modify the duty cycle count values. To this end, referring to FIG. 16, a portion of a system like the system illustrated in FIG. 15 is provided that is consistent with this additional embodiment of the invention. Portions of FIG. 15 that are not repeated and have no counterpart in FIG. 16 are similar to those in FIG. 15 and components in FIG. 16 that are identified by numbers that are identical to numbers in FIG. 15 are similar and therefore are not explained again here in detail.

Figure 16:
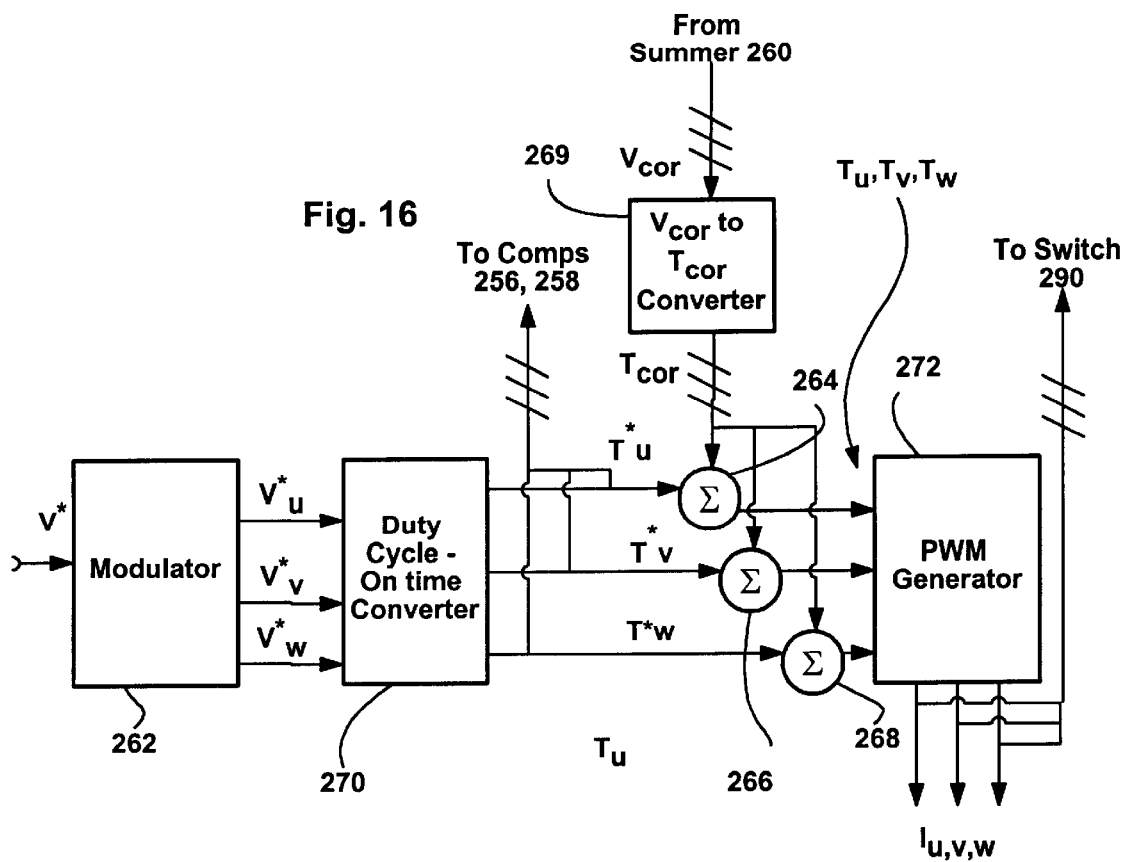
FIG. 16 is a diagram similar to FIG. 15, albeit illustrating another embodiment of the present invention.

In FIG. 16, the output of modulator 262 is provided to a duty cycle-on time converter 270 which converts the modulating waveforms to duty cycle counts $T^*_u$, $T^*_v$ and $T^*_w$. The counts $T^*_u$, $T^*_v$ and $T^*_w$ are provided as inputs to summers 264, 266 and 268, respectively. IN addition the counts $T^*_u$, $T^*_v$ and $T^*_w$ are provided as inputs to compensators 256 and 258 (see also FIG. 15) to be used in compensation algorithms described above and elaborated on hereinafter. Each of summers 264m 266 and 268 receives a separate count correction value $T_{cor}$ from a voltage to count converter 269 and mathematically combines the correction values and the count values $T^*_u$, $T^*_v$ and $T^*_w$ to generate corrected count values $T_u$, $T_v$ and $T_w$, respectively. The corrected values $T_u$, $T_v$ and $T_w$ are provided to generator 272 which operates in the manner described above. Currents are sensed at the output of generator 272 and fed back to switch 290 as described above.

Referring still to FIG. 16 and also to FIG. 15, values $T^*_u$, $T^*_v$ and $T^*_w$ are used by compensator 256 in the manner described above. With respect to device dynamics compensator 258, in the case of a duty cycle modifying configuration the corrections are performed on a pulse by pulse basis to adjust the turn on and turn off times of each PWM pulse generated. In addition, the pulse by pulse corrections are a function of both the feedback currents as well as the count cycles. Thus, referring again to FIGS. 3a–3d, noting that when the carrier signal 36 is counting up and intersects the modulating signal 38 the corresponding upper switch is turned off and the lower on and that when the carrier signal 36 intersects the modulating signal 38 on the way down the corresponding upper and lower switches turn on and off, respectively, device dynamics errors can be expressed by the following equations, where the carrier counter 36 is counting up upon intersection:

where $I_{thresh} > i_u > 0$:

$$V_{dye}=f(|i_u|) \qquad \text{Eq. 23}$$

and where $i_u < 0$:

$$V_{dye}=T_{on} \qquad \text{Eq. 24}$$

and, where the carrier counter 36 is counting down upon intersection:
where $i_u > 0$:

$$V_{dye}=T_{on} \qquad \text{Eq. 25}$$

and where $-I_{thresh<iu} < 0$:

$$V_{dye}=-f(|i_u|) \qquad \text{Eq. 26}$$

Referring again to FIGS. 10a and 13, whenever transitioning from low to high (i.e., when the carrier is counting up during intersection with the modulating wave), the dynamics error causes too few volt-seconds and therefore the error $V_{dye}$ must be added to the command voltage. Similarly, when transitioning from high to low the error causes excessive volt-seconds and therefore the error $V_{dye}$ has to be subtracted from the command or modulating voltage. Thus, referring also to FIG. 16, the results from Equations 23 and 24 can be subtracted from the sum of the dead time error and the device drop error via summers 260 while the results from Equations 25 and 26 can be added to the sum of the dead time error and the device drop error via summers 260 to generate the correction voltage $V_{cor}$.

Correction voltage $V_{cor}$ is then provided to converter 269 which solves Equation 2 above for $T_{cor}$ (i.e., for $T_e$) with $V_{cor}$ as $V_e$ and provides a separate $T_{cor}$ value for each system phase. Value $T_{cor}$ are provided to summers 264, 266 and 268 which add the correction counts to the duty cycle counts $T^*_u$, $T^*_v$ and $T^*_w$ to generate the corrected count values $T_u$, $T_v$ and $T_w$ as described above. Again, as above, here system function f can take on a linear, piecewise linear, polynomial, or dynamic form and exemplary values may be determined via a commissioning procedure like the one described above.

To apprise the public of the scope of this invention, the following claims are made:

What is claimed is:

1. An apparatus for mitigating distortion at the output terminals of a multi-phase inverter drive system linked via supply lines to a load wherein the system includes an inverter and an inverter controller, the inverter including a plurality of switches that link positive and negative DC buses to the lines at output terminals, the controller receiving modulating signals and carrier signals and comparing the modulating signals and the carrier signals to generate firing pulses to control the switches, the inverter characterized by device drop losses and the system, load and lines characterized by device dynamics losses that cause terminal current distortion, device errors including both device drop and device dynamics losses, the apparatus comprising, for each phase:

a device compensator receiving system phase current signals and, based on the received current signals, generating a device error compensation signal; and a summer receiving the phase modulating signal and the device error compensation signal and mathematically combining the modulating signal and error signal to generate a compensated modulating signal, the summer providing the compensated modulating signal to the controller for comparison to the carrier signal.

2. The apparatus of claim 1 further including, for each phase, a dead time compensator that generates a dead time compensation error signal se that is provided to the summer, the summer, mathematically combining the dead time compensation signal, the modulating signal and the device error signal for the phase to generate the compensated modulating signals.

3. The apparatus of claim 2 wherein the device compensator includes both a device drop compensator and a device dynamics compensator and the device error signal includes both a device drop error and a device dynamics error signal, the summer, for each phase, mathematically combining each of the modulating signal, the device drop error signal, the device dynamics error signal and the dead time compensation error signal to generate the compensated modulating signals.

4. The apparatus of claim 3 wherein the controller generates a duty cycle count for each phase and the device drop compensator receives the cycle count and generates a device drop error signal as a function of both the current signals and the cycle count.

5. The apparatus of claim 4 wherein the device dynamics compensator receives the cycle count and generates the device dynamics error signal as a function of both the current signals and the cycle count.

6. The apparatus of claim 4 further including a temperature module that determines the temperature of the inverter devices and provides a temperature signal to the device drop compensator, the device drop compensator generating the device drop error signal as a function of the temperature signal, the current signal and the cycle count.

7. The apparatus of claim 1 wherein the current signals are phase current command signals.

8. The apparatus of claim 1 further including current sensors linked to each of the supply lines and wherein the current signals are feedback signals indicating the line currents supplied to the load.

9. The apparatus of claim 1 wherein the device compensator includes a device drop compensator, for each phase, the controller generates a duty cycle count indicating the percent $T_a/T_s$ of a carrier cycle $T_s$ during which the phase is linked to the positive DC rail, the inverter includes a switch and inverse parallel diode bridge and the device drop error signal $V_{dde}$ determined by solving the following equations, where i>0:

$$V_{dde}=(T_a/T_s)(-V_{igbt})+(1-T_a/T_s)(-V_{diode})$$

and, where i<0:

$$V_{dde}=(T_a/T_s)(V_{diode})+(1-T_a/T_s)(V_{igbt}),$$

where $V_{diode}$ is the voltage drop across a conducting diode and $V_{igbt}$ is the voltage drop across a conducting switch.

10. The apparatus of claim 9 further including a temperature module that determines the temperature of the inverter devices and provides a temperature signal to the device drop compensator, the $V_{igbt}$ and $V_{diode}$ values determined by solving the following equations:

$$V_{ight}=(|I_u|)(S_{slope})+V_{Sbias}$$

$$V_{diode}=(|I_u|)(D_{slope})+V_{dbias}$$

where $|i_u|$ is the magnitude of the phase current, $S_{slope}$ is a predetermined value corresponding to how fast an exemplary switch changes state as a function of temperature, $V_{Sbias}$ is a nominal voltage drop corresponding to the switch, $D_{slope}$ is a predetermined value corresponding to how fast the diode changes state as a function of temperature and $V_{dbias}$ is a nominal voltage drop corresponding to the diode.

11. The apparatus of claim 1 wherein the device compensator includes a device dynamics compensator and wherein the dynamics compensator determines the dynamics error signal by solving the following equations:

where: $I_{thresh}>i_u>0$:

$$V_{dye}=K(I_{thresh}-|i_u|)$$

else, where: $I_{thresh}<i_u<0$:

$$V_{dye}=-K(I_{thresh}-|i_u|)$$

where K is a constant corresponding to an average correction value required to generate essentially expected phase currents given different command voltages and $I_{thresh}$ is a threshold current that is within a range of between 10 and 40% of a rated current for the system and $i_u$ is the phase current value.

12. The apparatus of claim 11 wherein the dynamics error signal is identified by solving the following equations:

| where: | $i_u > 0$: | $V_{dye} = K(|_{thresh} - |i_u|)$ |
| else, where: | $i_u < 0$: | $V_{dye} = -K(|_{thresh} - |i_u|)$. |

13. The apparatus of claim 11 wherein, when $i_u > 0$ the summer subtracts the device dynamic error from the modulating signal and where $i_u < 0$ the summer adds the device dynamic error to the modulating signal.

14. The apparatus of claim 11 wherein the controller generates a carrier count that counts back and forth between a minimum number and a maximum number and wherein the dynamics compensator determines the dynamics error signal by solving the following equations, where the carrier count is counting up:

| where: | $|_{thresh} > i_u < 0$: | $V_{dye} = K(|_{thresh} - |i_u|)$ |
| else, where: | $i_u < 0$: | $V_{dye} = T_{on}$ | and, where the carrier counter is counting down:

| where: | $i_u > 0$: | $V_{dye} = T_{on}$ |
| else, where: | $|_{thresh} < i_u < 0$: | $V_{dye} = -K(|_{thresh} - |i_u|)$ | where, when the counter is counting up, the device dynamics compensator subtracts the device dynamics error from the modulating signal and when the counter is counting down the device dynamics compensator adds the device dynamics error to the modulating signal.

15. The apparatus of claim 11 wherein the K value is determined during a commissioning procedure wherein two different DC values are used to drive the system, resulting currents are compared to expected currents and first and second gain values are generated that cause the resulting currents to essentially equal the expected currents, the K value being the average of the first and second gain values.

16. A method for mitigating distortion at the output terminals of a multi-phase inverter drive system linked via supply lines to a load wherein the system includes an inverter and an inverter controller, the inverter including a plurality of switches that link positive and negative DC buses to the lines at output terminals, the controller receiving modulating signals and carrier signals and comparing the modulating signals and the carrier signals to generate firing pulses to control the switches, the inverter characterized by device drop losses and the system, load and lines characterized by device dynamics losses that cause terminal current distortion, device errors including both device drop and device dynamics losses, the method comprising the steps of, for each phase:
  generating a device error compensation signal as a function of system phase current signals;
  mathematically combining the modulating signal and error signal to generate a compensated modulating signal; and
  providing the compensated modulating signal to the controller for comparison to the carrier signal.

17. The method of claim 15 further including the steps of, for each phase, generating a dead time compensation signal as a function of the phase current and wherein the step of mathematically combining includes combining the dead time compensation signal, the modulating signal and the device error signal to generate the compensated modulating signals.

18. The method of claim 17 wherein the step of generating the device error signal includes the steps of generating both a device drop error signal and a device dynamics error signal and wherein the step of mathematically combining includes the step of mathematically combining each of the modulating signal, the device drop error signal, the device dynamics error signal and the dead time compensation error signal to generate the compensated modulating signals.

19. The method of claim 18 wherein the controller generates a duty cycle count for each phase and the step of generating a device compensation signal includes generating a device drop error signal as a function of both the current signals and the cycle count.

20. The method of claim 19 wherein the step of generating the device dynamics error signal includes generating the device dynamics compensation signal as a function of both the current signals and the cycle count.

21. The method of claim 19 further including the steps of determining the temperature of the inverter devices and providing a temperature signal and wherein the step of generating the device drop error signal includes generating the device drop error signal as a function of the temperature signal, the current signal and the cycle count.

22. The method of claim 16 further including the step of determining the supply line currents and providing the line currents as the phase currents.

23. The method of claim 16 wherein the device compensator includes a device drop compensator, for each phase, the controller generates a duty cycle count indicating the percent $T_a/T_s$ of a carrier cycle $T_s$ during which the phase is linked to the positive DC rail, the inverter includes a switch and inverse parallel diode bridge and the step of determining the device drop error signal value is determined by solving the following equations, where $i > 0$:

$$V_{dde} = (T_a/T_s)(-V_{igbt}) + (1 - T_a/T_s)(-V_{diode})$$

and, where $i < 0$:

$$V_{dde} = (T_a/T_s)(V_{diode}) + (1 - T_a/T_s)(V_{igbt}),$$

where $V_{diode}$ is the voltage drop across a conducting diode and $V_{igbt}$ is the voltage drop across a conducting switch.

24. The method of claim 23 further including the step of determining the temperature of the inverter devices and identifying the $V_{igbt}$ and $V_{diode}$ values by solving the following equations:

$$V_{ight} = (|I_u|)(S_{slope}) + V_{Sbias}$$

$$V_{diode} = (|i\ I_u|)(D_{slope}) + V_{dbias}$$

where $|i_u|$ is the magnitude of the phase current, $S_{slope}$ is a predetermined value corresponding to how fast an exemplary switch changes state as a function of temperature, $V_{Sbias}$ is a nominal voltage drop corresponding to the switch, $D_{slope}$ is a predetermined value corresponding to how fast the diode changes state as a function of temperature and $V_{dbias}$ is a nominal voltage drop corresponding to the diode.

25. The method of claim 16 wherein the step of generating a device error compensation signal includes generating device a device dynamics error signal by solving the following equations:

| | | |
|---|---|---|
| where: | $\|I_{thresh}\| > \|i_u\| > 0$: | $V_{dye} = K(\|I_{thresh}\| - \|i_u\|)$ |
| else, where: | $\|I_{thresh}\| < \|i_u\| < 0$: | $V_{dye} = -K(\|I_{thresh}\| - \|i_u\|)$ | where K is a constant corresponding to an average correction value required to generate essentially expected phase currents given different command voltages and $I_{thresh}$ is a threshold current that is within a range of between 10 and 40% of a rated current for the system and $i_u$ is the phase current value.

26. The apparatus of claim 25 wherein the dynamics error signal is identified by solving the following equations:

| | | |
|---|---|---|
| where: | $i_u > 0$: | $V_{dye} = K(\|I_{thresh}\| - \|i_u\|)$ |
| else, where: | $i_u < 0$: | $V_{dye} = =K(\|I_{thresh}\| - \|i_u\|)$ |

27. The apparatus of claim 26 wherein, when $i_u > 0$ the step of mathematically combining includes subtracting the device dynamic error from the modulating signal and where $i_u < 0$ the step of mathematically combining includes adding the device dynamic error to the modulating signal.

28. The apparatus of claim 26 wherein the controller generates a carrier count that counts back and forth between a minimum number and a maximum number and wherein the step of determining the dynamics error signal includes solving the following equations, where the carrier count is counting up:

| | | |
|---|---|---|
| where: | $\|I_{thresh}\| > \|i_u\| > 0$: | $V_{dye} = K(\|I_{thresh}\| - \|i_u\|)$ |
| else, where: | $i_u < 0$: | $V_{dye} = T_{on}$ | and, where the carrier counter is counting down:

| | | |
|---|---|---|
| where: | $i_u > 0$: | $V_{dye} = T_{on}$ |
| else, where: | $\|I_{thresh}\| < \|i_u\| < 0$: | $V_{dye} = -K(\|I_{thresh}\| - \|i_u\|)$. |

\* \* \* \* \*